United States Patent
Yamamoto

(10) Patent No.: US 11,958,384 B2
(45) Date of Patent: Apr. 16, 2024

(54) VEHICLE ACTION CONTROL DEVICE

(71) Applicant: ADVICS CO., LTD., Kariya (JP)

(72) Inventor: Yusaku Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 236 days.

(21) Appl. No.: 17/424,920

(22) PCT Filed: Jan. 24, 2020

(86) PCT No.: PCT/JP2020/002507
§ 371 (c)(1),
(2) Date: Jul. 22, 2021

(87) PCT Pub. No.: WO2020/153476
PCT Pub. Date: Jul. 30, 2020

(65) Prior Publication Data
US 2022/0105809 A1    Apr. 7, 2022

(30) Foreign Application Priority Data

Jan. 25, 2019  (JP) .................................. 2019-010795
Jan. 23, 2020  (JP) .................................. 2020-008876

(51) Int. Cl.
*B60L 7/26* (2006.01)
*B60T 8/1755* (2006.01)
(Continued)

(52) U.S. Cl.
CPC ............ *B60L 7/26* (2013.01); *B60T 8/17554* (2013.01); *B60T 8/1766* (2013.01);
(Continued)

(58) Field of Classification Search
CPC ...... B60L 7/26; B60T 8/17554; B60T 8/1766; B60T 2201/16; B60T 2250/03;
(Continued)

(56) References Cited

U.S. PATENT DOCUMENTS

2005/0012392 A1\* 1/2005 Kato ................... B60T 8/17554
                                                              303/145
2005/0023895 A1\* 2/2005 Yasutake ............... B60T 8/1755
                                                              303/146

(Continued)

FOREIGN PATENT DOCUMENTS

JP    2008201358 A    9/2008
JP    2018043707 A    3/2018
(Continued)

OTHER PUBLICATIONS

International Search Report (PCT/ISA/210) with translation and Written Opinion (PCT/ISA/237) dated Apr. 7, 2020, by the Japanese Patent Office as the International Searching Authority for International Application No. PCT/JP2020/002507.

*Primary Examiner* — Jeff A Burke
*Assistant Examiner* — Mohamad O El Sayah
(74) *Attorney, Agent, or Firm* — BUCHANAN INGERSOLL & ROONEY PC

(57) ABSTRACT

The control device includes a vehicle required braking force acquisition unit that acquires a vehicle required braking force that is a required value of the braking force applied to the vehicle, and a roll control unit that controls the rolling motion of the vehicle by adjusting a distribution ratio of the braking force with respect to a target wheel including at least one of a rear wheel on an inside during turning and a front wheel on an outside during turning of the vehicle when the braking force is applied to the vehicle according to the vehicle required braking force under a situation where the vehicle is turning.

23 Claims, 12 Drawing Sheets

(51) Int. Cl.
*B60T 8/1766* (2006.01)
*B60W 30/045* (2012.01)
*B60W 40/112* (2012.01)

(52) U.S. Cl.
CPC ....... *B60T 2201/16* (2013.01); *B60T 2250/03* (2013.01); *B60W 30/045* (2013.01); *B60W 40/112* (2013.01); *B60W 2520/14* (2013.01); *B60W 2520/18* (2013.01); *B60W 2720/18* (2013.01)

(58) Field of Classification Search
CPC ............. B60W 30/045; B60W 40/112; B60W 2520/14; B60W 2520/18; B60W 2720/18
See application file for complete search history.

(56) References Cited

U.S. PATENT DOCUMENTS

| | | | |
|---|---|---|---|
| 2007/0112498 A1* | 5/2007 | Yasutake | B60T 8/17554 701/72 |
| 2010/0174453 A1 | 7/2010 | Takahara et al. | |
| 2010/0270855 A1* | 10/2010 | Sawada | B60T 8/1766 303/113.2 |
| 2012/0049617 A1* | 3/2012 | Furuyama | B60T 13/662 303/9.75 |
| 2014/0145498 A1 | 5/2014 | Yamakado et al. | |
| 2016/0347181 A1* | 12/2016 | Yamakado | B60L 15/2009 |

FOREIGN PATENT DOCUMENTS

| | | |
|---|---|---|
| JP | 2018095112 A | 6/2018 |
| JP | 2018131088 A | 8/2018 |
| WO | 2012043683 A1 | 4/2012 |

* cited by examiner

VEHICLE BODY SPEED

LONGITUDINAL
ACCELERATION

LATERAL ACCELERATION

BRAKING FORCE APPLIED
TO FRONT WHEEL ON
OUTSIDE DURING TURNING

BRAKING FORCE APPLIED
TO FRONT WHEEL ON
INSIDE DURING TURNING

BRAKING FORCE APPLIED
TO REAR WHEEL ON
OUTSIDE DURING TURNING

BRAKING FORCE APPLIED
TO REAR WHEEL ON INSIDE
DURING TURNING

FIG. 9A VEHICLE BODY SPEED
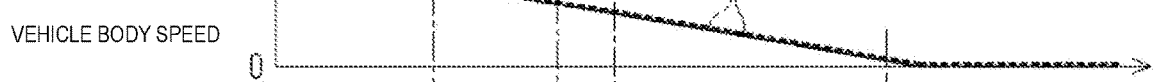
FIG. 9B LONGITUDINAL ACCELERATION
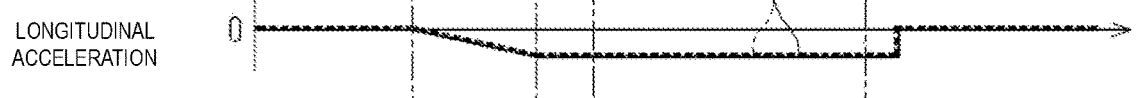
FIG. 9C LATERAL ACCELERATION
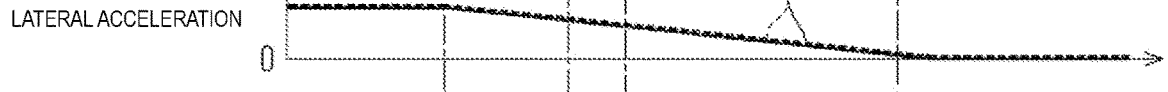
FIG. 9D BRAKING FORCE APPLIED TO FRONT WHEEL ON OUTSIDE DURING TURNING
FIG. 9E BRAKING FORCE APPLIED TO FRONT WHEEL ON INSIDE DURING TURNING
FIG. 9F BRAKING FORCE APPLIED TO REAR WHEEL ON OUTSIDE DURING TURNING
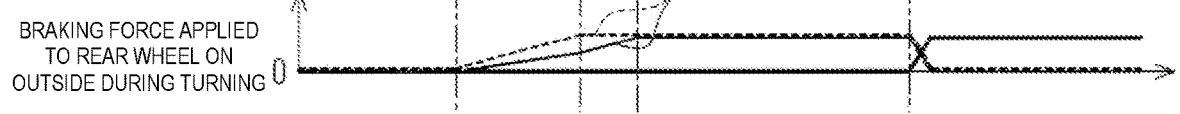
FIG. 9G BRAKING FORCE APPLIED TO REAR WHEEL ON INSIDE DURING TURNING
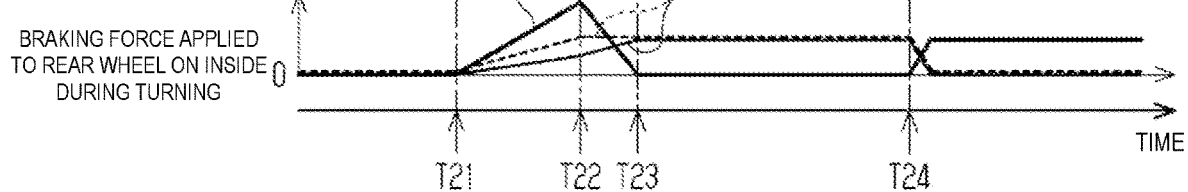

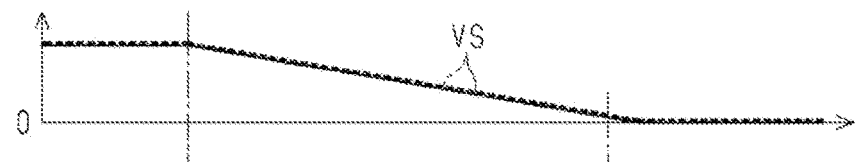

FIG. 10A
VEHICLE BODY SPEED

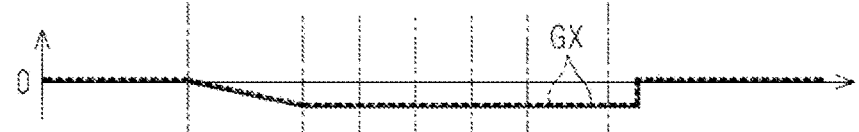

FIG. 10B
LONGITUDINAL ACCELERATION

FIG. 10C
LATERAL ACCELERATION

FIG. 10D
BRAKING FORCE APPLIED TO FRONT WHEEL ON OUTSIDE DURING TURNING (BRAKING FORCE APPLIED TO FRONT WHEEL ON INSIDE DURING TURNING)

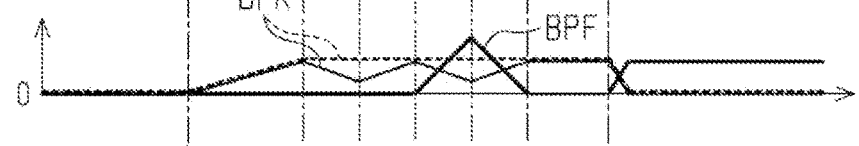

FIG. 10E
BRAKING FORCE APPLIED TO FRONT WHEEL ON INSIDE DURING TURNING (BRAKING FORCE APPLIED TO FRONT WHEEL ON OUTSIDE DURING TURNING)

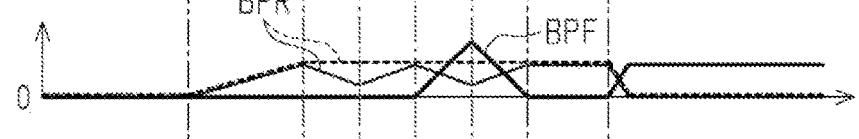

FIG. 10F
BRAKING FORCE APPLIED TO REAR WHEEL ON OUTSIDE DURING TURNING (BRAKING FORCE APPLIED TO REAR WHEEL ON INSIDE DURING TURNING)

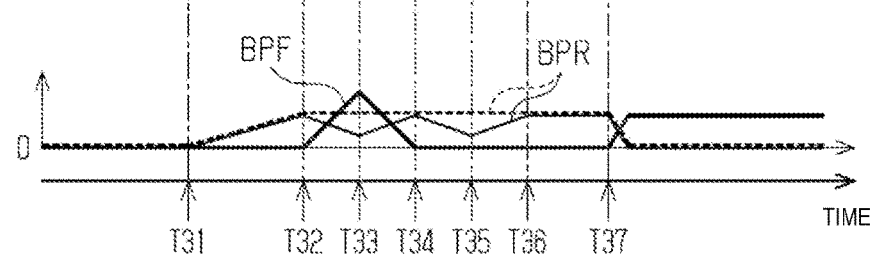

FIG. 10G
BRAKING FORCE APPLIED TO REAR WHEEL ON INSIDE DURING TURNING (BRAKING FORCE APPLIED TO REAR WHEEL ON OUTSIDE DURING TURNING)

FIG. 13A VEHICLE BODY SPEED
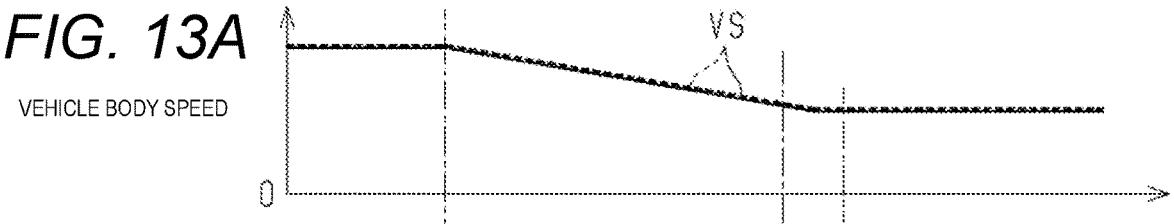
FIG. 13B LONGITUDINAL ACCELERATION
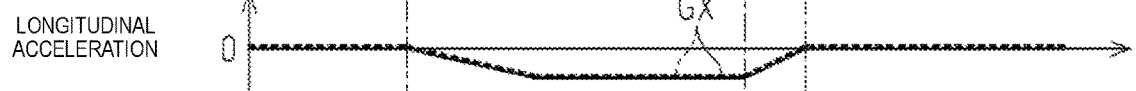
FIG. 13C LATERAL ACCELERATION
FIG. 13D BRAKING FORCE APPLIED TO FRONT WHEEL ON OUTSIDE DURING TURNING
FIG. 13E BRAKING FORCE APPLIED TO FRONT WHEEL ON INSIDE DURING TURNING
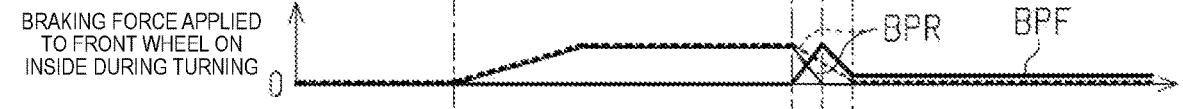
FIG. 13F BRAKING FORCE APPLIED TO REAR WHEEL ON OUTSIDE DURING TURNING
FIG. 13G BRAKING FORCE APPLIED TO REAR WHEEL ON INSIDE DURING TURNING
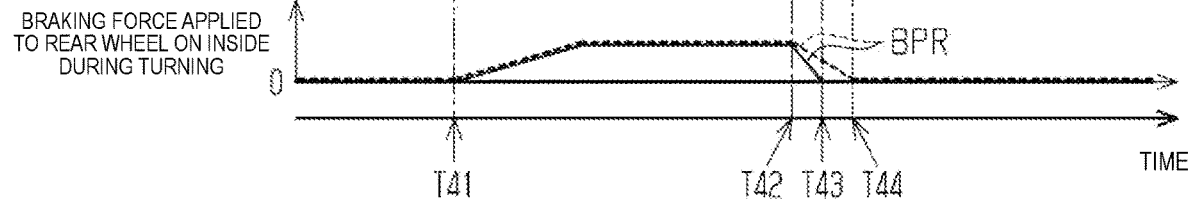

VEHICLE ACTION CONTROL DEVICE

TECHNICAL FIELD

The present disclosure relates to a vehicle action control device.

BACKGROUND ART

Patent Literature 1 describes an example of an action control device that automatically turns a vehicle along a curved road. In this action control device, when the lateral acceleration or the yaw rate of the vehicle exceeds the determination value, the vehicle is decelerated by applying the braking force.

CITATIONS LIST

Patent Literature

Patent Literature 1: Japanese Unexamined Patent Application Publication No. 2018-95112

SUMMARY

Technical Problems

When the vehicle turns, the vehicle performs a rolling motion and the roll angle of the vehicle changes. In recent years, it is required to improve the comfort of the occupant of the vehicle at the time of turning the vehicle.

Solutions to Problems

A vehicle action control device for solving the above problem is applied to a vehicle in which an anti-dive force that is a force for displacing a front portion of the vehicle upward is generated when a braking force is applied to a front wheel, and an anti-lift force that is a force for displacing a rear portion of the vehicle downward is generated when a braking force is applied to a rear wheel. This action control device includes: a vehicle required braking force acquisition unit that acquires a vehicle required braking force which is a required value of the braking force to be applied to the vehicle; and a roll control unit that controls a rolling motion of the vehicle by adjusting a distribution ratio of the braking force with respect to a target wheel including at least one of a rear wheel on an inside during turning of the vehicle and a front wheel on an outside during turning of the vehicle when the braking force is applied to the vehicle according to the vehicle required braking force under a situation where the vehicle is turning.

As a result of conducting various experiments and simulations, the inventor of the present application has obtained knowledge that it is possible to improve the comfort of the occupant of the vehicle at the time of turning of the vehicle by appropriately controlling the rolling motion at the time of turning of the vehicle. According to the above configuration, when the braking force is applied to the vehicle at the time of turning of the vehicle, the rolling motion of the vehicle is adjusted by adjusting the distribution ratio of the braking force with respect to at least one of the rear wheel on the inside during turning and the front wheel on the outside during turning. For example, when the braking force with respect to the rear wheel on the inside during turning is adjusted, the rolling motion at the time of turning of the vehicle is adjusted by adjusting the anti-lift force generated in the vicinity of the rear wheel on the inside during turning in the rear portion of the vehicle. Furthermore, for example, when the braking force with respect to the front wheel on the outside during turning is adjusted, the rolling motion of the vehicle is adjusted by adjusting the anti-dive force generated in the vicinity of the front wheel on the outside during turning in the front portion of the vehicle. Therefore, according to the above configuration, it is possible to improve the comfort of the occupant of the vehicle at the time of turning of the vehicle.

BRIEF DESCRIPTION OF DRAWINGS

FIGS. 9A-9G are timing charts in a case where the roll suppression control is executed while the vehicle is turning in the third embodiment.

FIGS. 10A-10G are timing charts in a case where the roll suppression control is performed while the vehicle is turning in a fourth embodiment.

FIGS. 13A-13G are timing charts in a case where the roll promotion control is performed while the vehicle is turning in the fifth embodiment.

DESCRIPTION OF EMBODIMENT

First Embodiment

Hereinafter, a first embodiment of a vehicle action control device will be described with reference to FIGS. 1-4 and 5A-5G.

Figure 1:
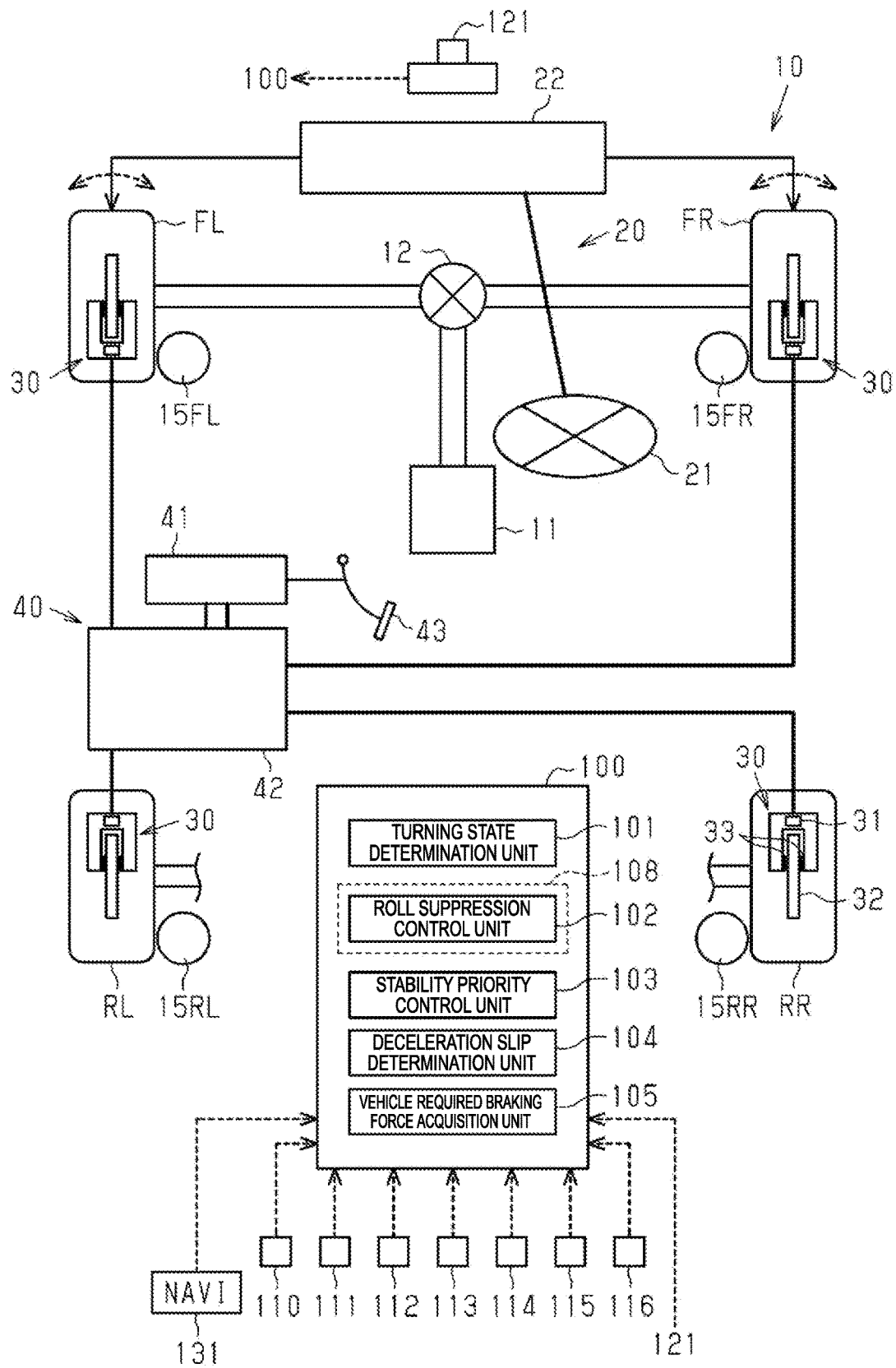
FIG. 1 is a schematic configuration diagram showing a functional configuration of a control device serving as a first embodiment of a vehicle action control device and a vehicle equipped with the control device.

FIG. 1 shows a vehicle 10 equipped with a control device 100 which is an action control device of the present embodiment. Among a plurality of wheels provided in the vehicle 10, the left front wheel FL and the right front wheel FR are driving wheels to which driving force output from a power source 11 of the vehicle such as an engine is input via a differential 12. The left rear wheel RL and the right rear wheel RR of the plurality of wheels are driven wheels.

A steering device 20 of the vehicle includes a steering actuator 22 that adjusts the steering angles of the front wheels FL and FR, which are also steering wheels, according to the operation of the steering wheel 21 by the driver. The actuation of the steering actuator 22 can also be controlled by the control device 100. By controlling the steering actuator 22 with the control device 100, the steering angles of the front wheels FL and FR can be controlled even when the driver is not steering, that is, the vehicle 10 can be automatically turned.

The braking force is applied to each of the wheels FL, FR, RL, and RR by the actuation of a braking mechanism 30. Each braking mechanism 30 is configured such that the force of pressing a friction material 33 against a rotating body 32 rotating integrally with the wheels FL, FR, RL, and RR increases as the WC pressure PWC, which is the fluid pressure in the wheel cylinder 31, increases. Therefore, the braking force applied to the wheels FL, FR, RL, and RR increases as the WC pressure PWC increases.

A braking device 40 of the vehicle is an example of a friction braking device that adjusts the braking force applied to each of the wheels FL, FR, RL, and RR. The braking device 40 includes a fluid pressure generation device 41 and a braking actuator 42 to which brake fluid is supplied from the fluid pressure generation device 41. A braking operation member 43 such as a brake pedal is connected to the fluid pressure generation device 41. Then, the fluid pressure generation device 41 generates the fluid pressure corresponding to the braking operation amount that is the operation amount of the braking operation member 43 by the driver of the vehicle 10. The braking actuator 42 is connected to each wheel cylinder 31. Therefore, when the braking operation member 43 is operated, the brake fluid of an amount corresponding to the braking operation amount is supplied to each wheel cylinder 31. That is, the braking force is applied to each of the wheels FL, FR, RL, and RR. The braking force applied to the wheels FL, FR, RL, and RR by actuating the braking mechanism 30 is also referred to as "friction braking force".

The actuation of the braking actuator 42 can be controlled by the control device 100. The braking force applied to each of the wheels FL, FR, RL, and RR can be individually controlled by controlling the braking actuator 42 by the control device 100.

The vehicle 10 is provided with various sensors such as an operation amount sensor 110, a wheel speed sensor 111, a longitudinal acceleration sensor 112, a lateral acceleration sensor 113, a yaw rate sensor 114, a steering angle sensor 115, and a suspension stroke sensor 116. Signals from these various sensors 110 to 116 are input to the control device 100. Furthermore, signals are also input to the vehicle 10 from a camera 121 or a radar that acquires external information of the periphery of the vehicle 10.

The operation amount sensor 110 detects the braking operation amount INP of the driver and outputs a signal corresponding to the detected braking operation amount INP. Examples of the braking operation amount INP include, for example, a stroke amount of the braking operation member 43 and an operation force input to the braking operation member 43.

The wheel speed sensor 111 is provided for each of the wheels FL, FR, RL, and RR. The wheel speed sensor 111 detects the wheel speeds VW of the corresponding wheels FL, FR, RL, and RR, and outputs a signal corresponding to the detected wheel speed VW. Then, the vehicle body speed VS of the vehicle 10 is calculated based on the wheel speed VW of each of the wheels FL, FR, RL, and RR. The vehicle body speed VS mentioned here is a rotation speed of the wheel corresponding to a moving speed of the vehicle 10 in the front-rear direction.

The longitudinal acceleration sensor 112 detects a longitudinal acceleration GX which is the acceleration in the longitudinal or front-rear direction of the vehicle 10, and outputs a signal corresponding to the detected longitudinal acceleration GX. The lateral acceleration sensor 113 detects a lateral acceleration GY which is an acceleration in a lateral direction of the vehicle 10, and outputs a signal corresponding to the detected lateral acceleration GY. The yaw rate sensor 114 detects a yaw rate YR of the vehicle 10 and outputs a signal corresponding to the detected yaw rate YR. The steering angle sensor 115 detects a steering angle STR of the steering wheel 21 and outputs a signal corresponding to the detected STR.

The suspension stroke sensor 116 is provided for each of the wheels FL, FR, RL, and RR. The suspension stroke sensor 116 detects a stroke amount SS of the corresponding wheel suspensions 15FL, 15FR, 15RL, and 15RR, and outputs a signal corresponding to the detected stroke amount SS.

Information on the travel route of the vehicle 10 is input from the navigation device 131 to the control device 100. Examples of the information on the travel route include a curvature radius of the travel route and a road surface gradient of the travel route. The navigation device 131 may be an in-vehicle navigation device or a tablet terminal having a navigation function.

Then, the control device 100 performs various vehicle controls on the basis of signals from the various sensors 111 to 116, signals from the camera 121, and information on a travel route from the navigation device 131.

When the vehicle 10 is decelerating by the application of the braking force, the vehicle 10 performs a pitching motion toward the nose-dive side. The nose dive is an action to displace the front portion of the vehicle 10 downward and displace the rear portion of the vehicle 10 upward. On the other hand, the action displacing the front portion of the vehicle 10 upward and displacing the rear portion of the vehicle 10 downward is referred to as "nose lift".

When the vehicle 10 performs the pitching motion toward the nose dive side, the sprung weight on the front wheel side increases, so that the front wheel springs constituting the suspensions 15FL and 15FR for the front wheels contract, and the sprung weight on the rear wheel side decreases, so that the rear wheel springs constituting the suspensions 15RL and 15RR for the rear wheels extend. The sprung weight is a load in a vertical direction input to the suspension from the vehicle body by the vehicle weight and the pitching moment. When the springs of each of the suspensions 15FL, 15FR, 15RL, and 15RR operate in this manner, a restoring force of the rear wheel spring and a restoring force of the front wheel spring are generated in the vehicle 10.

When the braking force is applied to the front wheels FL and FR, the anti-dive force FAD is generated at the front portion of the vehicle. When the braking force is applied to the rear wheels RL and RR, the anti-lift force FAL is generated at the rear portion of the vehicle. The anti-dive force FAD is a force for displacing the front portion of the vehicle upward when the braking forces BPFL and BPFR are applied to the front wheels FL and FR. The anti-dive force FAD increases as the braking forces BPFL and BPFR applied to the front wheels FL and FR increase. The anti-lift force FAL is a force for displacing the rear portion of the vehicle downward when the braking forces BPRL and BPRR are applied to the rear wheels RL and RR. The anti-lift force FAL increases as the braking forces BPRL and BPRR applied to the rear wheels RL and RR increase. In the present embodiment, the geometries of the front wheel suspensions 15FL and 15FR and the rear wheel suspensions 15RL and 15RR are set such that the anti-lift force FAL is larger than the anti-dive force FAD when the braking forces BPFL and BPFR applied to the front wheels FL and FR and the braking forces BPRL and BPRR applied to the rear wheels RL and RR have the same value.

Figure 2:
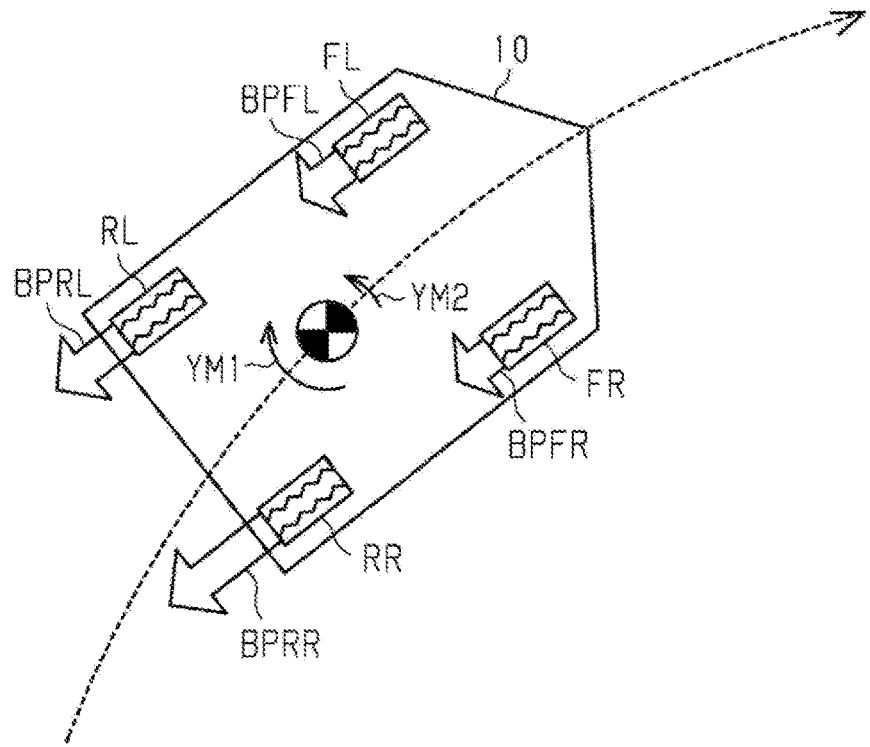
FIG. 2 is a schematic view illustrating a state in which a roll suppression control is performed while the vehicle is turning.

When the vehicle 10 turns, a centrifugal force acts on the center of gravity of the vehicle, so that the sprung weight of the wheel on the outside during turning increases while the sprung weight of the wheel on the inside during turning decreases. When the vehicle 10 turns right as illustrated in FIG. 2, the left wheels FL and RL correspond to the wheels on the outside during turning, and the right wheels FR and RR correspond to the wheels on the inside during turning. When the vehicle 10 is turning, the spring constituting the suspension for the wheels on the outside during turning contracts due to increase in the sprung weight. On the other hand, the spring constituting the suspension for the wheels on the inside during turning extends due to decrease in the sprung weight. As a result, at the time of turning of the vehicle 10, the vehicle 10 performs a rolling motion, and the roll angle Φ of the vehicle changes.

When the braking force is applied to the vehicle 10 at the time of turning, both the rolling motion and the pitching motion are performed in the vehicle 10. As a result, the sprung weight of the front wheel on the outside during turning among the wheels FL, FR, RL, and RR is maximized, and the sprung weight of the rear wheel on the inside during turning among the wheels FL, FR, RL, and RR is minimized.

Therefore, in order to suppress the change in the roll angle Φ at the time of turning of the vehicle 10, it is effective to increase the braking force applied to the front wheel on the outside during turning by increasing the distribution ratio of the braking force with respect to the front wheel on the outside during turning, and to increase the braking force applied to the rear wheel on the inside during turning by increasing the distribution ratio of the braking force with respect to the rear wheel on the inside during turning. In the present embodiment, as described above, the anti-lift force FAL tends to be larger than the anti-dive force FAD. Therefore, in the roll suppression control for suppressing the rolling motion of the vehicle 10 at the time of turning, the braking force applied to the rear wheel on the inside during turning is made larger than that at the time of not performing the roll suppression control by increasing the distribution ratio of the braking force with respect to the rear wheel on the inside during turning and the like. That is, when the vehicle 10 turns right as illustrated in FIG. 2, in the roll suppression control, for example, the distribution ratio of the braking force with respect to the right rear wheel RR corresponding to the rear wheel on the inside during turning is increased, so that the braking force BPRR applied to the right rear wheel RR becomes larger than the braking force BPFL applied to the left front wheel FL, the braking force BPFR applied to the right front wheel FR, and the braking force BPRL applied to the left rear wheel RL.

When the roll suppression control is performed in this manner, a large anti-lift force FAL is generated at the rear portion on the inside during turning of the vehicle 10. As a result, the rolling motion of the vehicle 10 can be suppressed, and furthermore, the change in the roll angle Φ of the vehicle 10 can be suppressed. Furthermore, the generation of the large anti-lift force FAL can suppress the pitching motion of the vehicle 10 at the time of deceleration of the vehicle 10, and thus can suppress change in the pitch angle of the vehicle 10.

When the roll suppression control is performed, a braking force difference ΔBPR (=BPRR−BPRL) generates between the left and right rear wheels RL and RR. Therefore, as illustrated in FIG. 2, in the vehicle 10, a yaw moment YM1 corresponding to the braking force difference ΔBPR generated between the left and right rear wheels RL and RR generates. Thus, in a case where the turning radius of the vehicle 10 is small or the vehicle body speed VS of the vehicle 10 is large, when the roll suppression control is performed, the stability of the action of the vehicle 10 may lower due to the generation of the yaw moment YM1. In the present embodiment, the yaw moment YM1 acts in a direction of increasing the oversteer tendency of the vehicle 10.

Therefore, in the present embodiment, the roll suppression control is performed when determination can be made that the vehicle 10 gradually turns, but the roll suppression control is not performed when determination cannot be made that the vehicle 10 gradually turns. That is, when determination cannot be made that the vehicle 10 gradually turns, stability priority control is performed.

Figure 3:
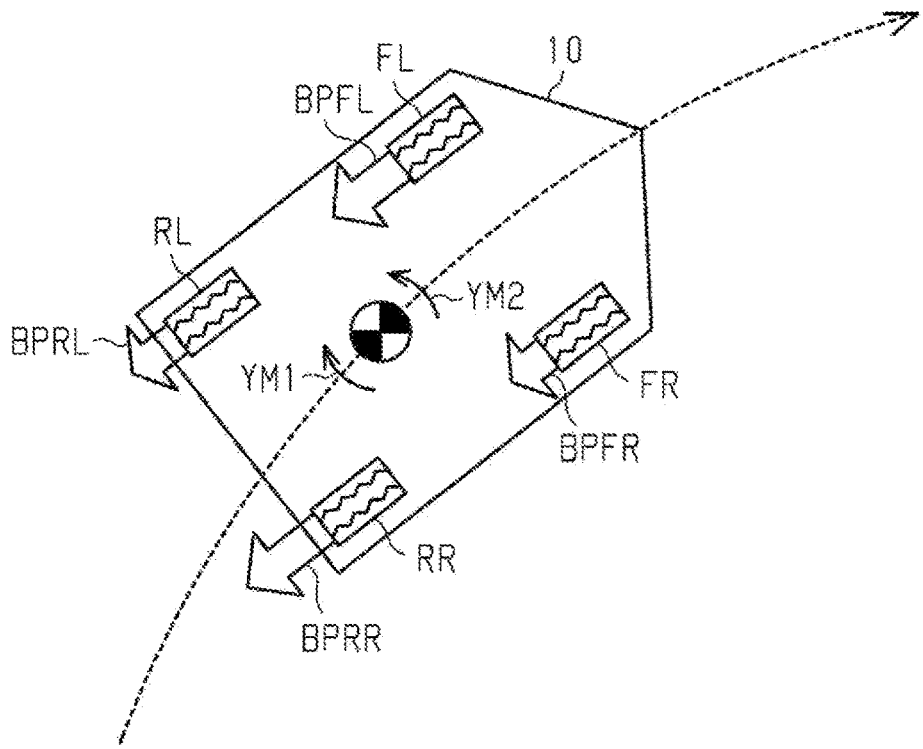
FIG. 3 is a schematic view illustrating a state in which a stability priority control is performed while the vehicle is turning.

The stability priority control performed in the present embodiment is a control for suppressing oversteering of the vehicle 10. FIG. 3 illustrates an example of a case where the stability priority control is performed at the time of turning of the vehicle 10. In the example illustrated in FIG. 3, the braking force BPRR applied to the right rear wheel RR, which is the rear wheel on the inside during turning, is larger than the braking force BPRL applied to the left rear wheel RL, which is the rear wheel on the outside during turning, and the braking force BPFL applied to the left front wheel FL, which is the front wheel on the outside during turning, is larger than the braking force BPFR applied to the right front wheel FR, which is the front wheel on the inside during turning. The braking force difference ΔBPR generated between the left and right rear wheels RL and RR when the stability priority control is performed is smaller than the braking force difference ΔBPR generated when the roll suppression control is performed. The yaw moment YM1 corresponding to the braking force difference ΔBPR generated between the left and right rear wheels RL and RR acts in a direction of increasing the oversteer tendency of the vehicle 10. On the other hand, a yaw moment YM2 corresponding to the braking force difference ΔBPF generated between the left and right front wheels FL and FR acts in a direction of increasing the understeer tendency of the vehicle 10. That is, since the direction of the yaw moment YM1 and the direction of the yaw moment YM2 are opposite to each other, the yaw moment YM1 is canceled out by the yaw moment YM2. As a result, the vehicle 10 is less likely to be oversteered at the time of turning.

Next, the control device 100 will be described with reference to FIG. 1.

The control device 100 includes a vehicle required braking force acquisition unit 105, a turning state determination unit 101, a roll control unit 108, a stability priority control unit 103, and a deceleration slip determination unit 104 as functional units that control the action of the vehicle 10 at the time of turning.

The vehicle required braking force acquisition unit 105 acquires the vehicle required braking force BPRC which is a required value of the braking force to apply to the vehicle 10. When the driver performs the braking operation, the vehicle required braking force BPRC increases as the braking operation amount INP increases. At the time of automatic braking, the vehicle required braking force BPRC increases as the target value XGT of the deceleration of the vehicle 10 increases.

The turning state determination unit 101 determines whether the vehicle 10 turns gradually. The term "gradual turning" as used herein refers to turning of the vehicle 10 in which, even when the roll suppression control is executed, the stability of the action of the vehicle 10 does not lower by the generation of the yaw moment YM1 from the execution of the roll suppression control, or the degree of lowering in the stability of the action falls within an allowable range. When the vehicle 10 travels at a lower speed or the turning radius of the vehicle 10 is larger, determination that the vehicle 10 gradually turns is easily made.

The turning state determination unit 101 determines whether or not the vehicle 10 gradually turns based on the steering angle of the steering wheel 21, the turning angle of the front wheels FL and FR which are steering wheels, the lateral acceleration GY, the yaw rate YR, and the vehicle body slip angle ASL at the time of turning of the vehicle 10. In addition, when the vehicle 10 turns in a state where the vehicle body speed VS of the vehicle large, a large yaw moment YM1 is generated and the action of the vehicle 10 tends to become unstable even if the braking force difference ΔBPR generated between the left and right rear wheels RL and RR is not so large. Therefore, the turning state determination unit 101 determines whether or not the vehicle 10 gradually turns based on the vehicle body speed VS of the vehicle 10. That is, in the present embodiment, the steering angle, the turning angles of the front wheels FL and FR, the lateral acceleration GY, the yaw rate YR, the vehicle body slip angle ASL, and the vehicle body speed VS correspond to parameters that affect the yawing motion of the vehicle 10 at the time of turning, that is, parameters indicating the yawing motion of the vehicle 10.

In addition, the turning state determination unit 101 determines whether or not the vehicle 10 gradually turns based on the curvature radius of the traveling course included in the information regarding the traveling course of the vehicle 10 input from the navigation device 131.

A specific content of the determination as to whether the vehicle 10 turns gradually will be described later.

The roll control unit 108 includes a roll suppression control unit 102. The roll suppression control unit 102 performs the roll suppression control when the turning state determination unit 101 determines that the vehicle 10 gradually turns. A specific content of the roll suppression control will be described later.

The stability priority control unit 103 performs the stability priority control when the turning state determination unit 101 does not determine that the vehicle 10 gradually turns at the time of turning of the vehicle 10.

The deceleration slip determination unit 104 determines whether a deceleration slip has occurred in the wheels FL, FR, RL, and RR. A specific content of the determination as to whether deceleration slip has occurred will be described later.

Next, a processing routine executed by the control device 100 when the vehicle 10 turns will be described with reference to FIG. 4. Note that this processing routine is repeatedly executed even when the vehicle 10 travels by automatic driving or when the vehicle 10 travels by manual driving. The manual driving herein refers to driving of the vehicle 10 with manual steering.

Figure 4:
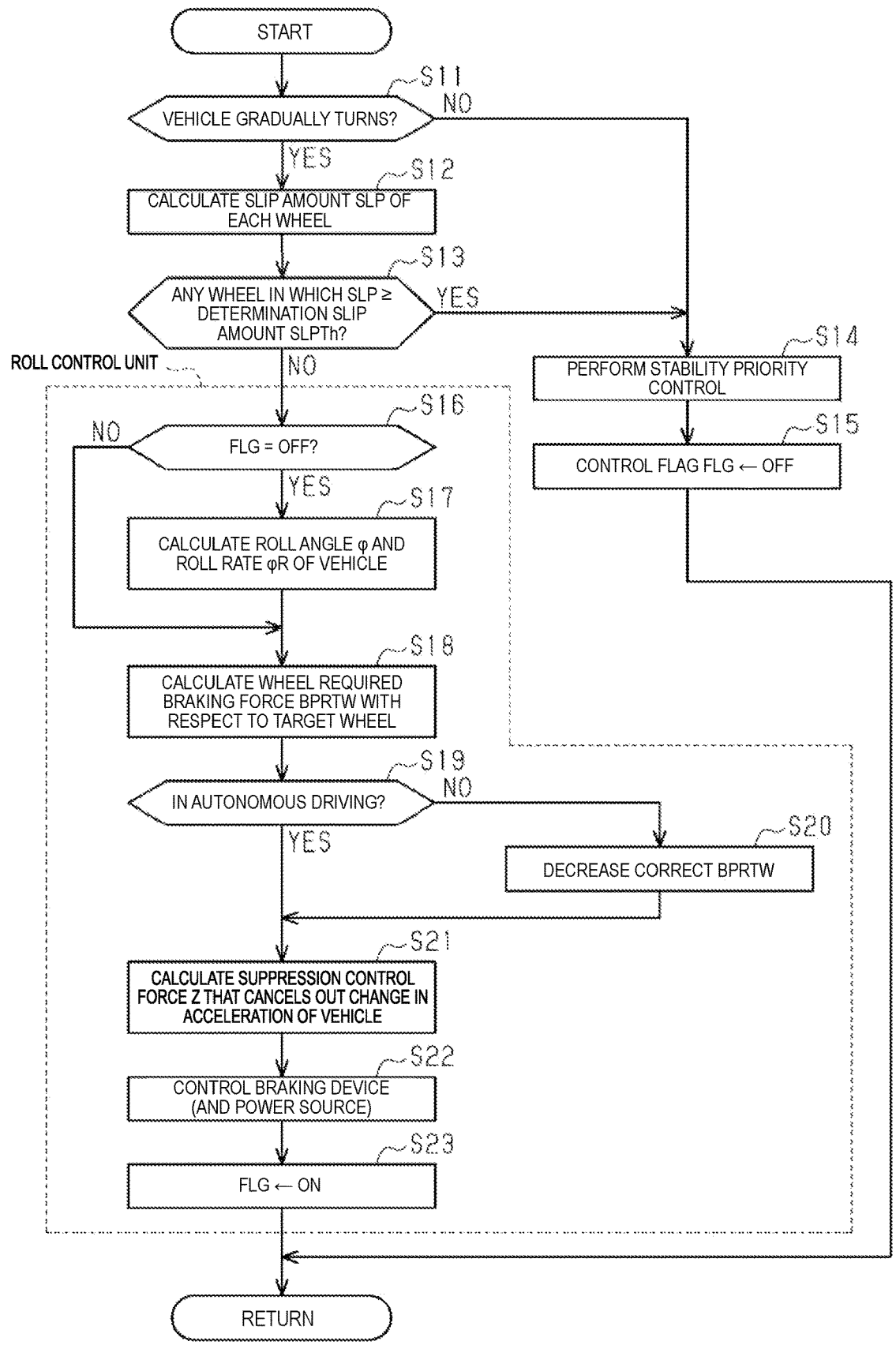
FIG. 4 is a flowchart describing a processing routine executed by the control device in the first embodiment.
Figure 5A:
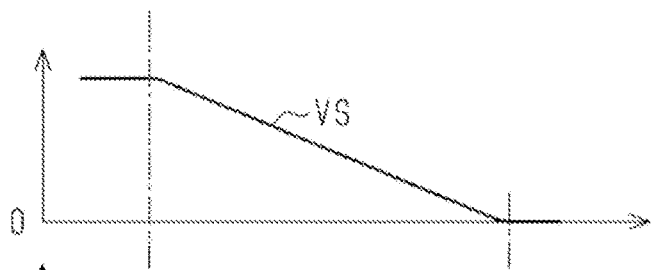
FIGS. 5A-5G are timing charts in a case where the roll suppression control is executed while the vehicle is turning in the first embodiment.
Figure 5B:
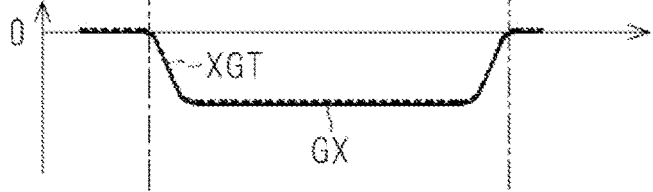
Figure 5C:
Figure 5D:
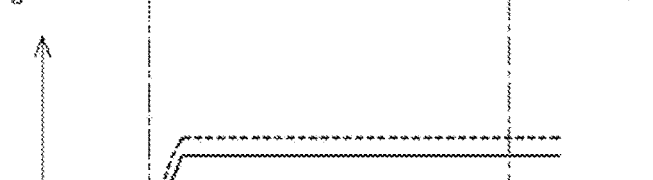
Figure 5E:
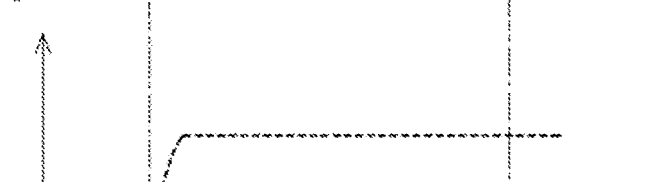
Figure 5F:
Figure 5G:
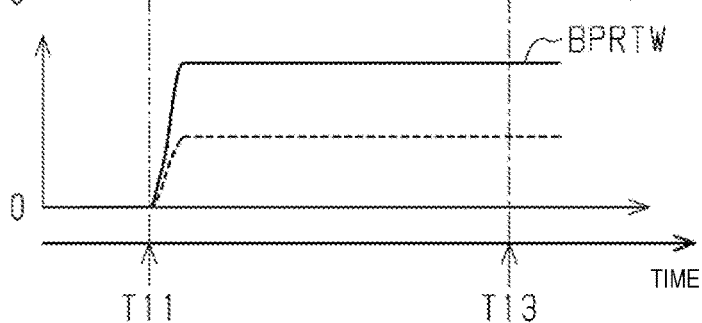

As illustrated in FIG. 4, in this processing routine, in step S11, the turning state determination unit 101 determines whether or not the vehicle 10 gradually turns. For example, the turning state determination unit 101 determines that the vehicle 10 gradually turns when any of the following plurality of conditions is satisfied.

(Condition 1) The absolute value of the lateral acceleration GY is less than a determination lateral acceleration GYTh.

(Condition 2) The absolute value of the yaw rate YR is less than a determination yaw rate YRTh.

(Condition 3) The absolute value of the vehicle body slip angle ASL of the vehicle is less than a determination slip angle ASLTh.

(Condition 4) The vehicle body speed VS of the vehicle 10 is less than a determination vehicle body speed VSTh.

Determination values such as the determination lateral acceleration GYTh, the determination yaw rate YRTh, and the determination slip angle ASLTh are set as determination criteria as to whether or not the degree of lowering in the stability of the action of the vehicle 10 can be kept within an allowable range when the yaw moment YM1 is generated by the execution of the roll suppression control. In the present embodiment, each of the above determination values corresponds to a "first predetermined value". Such a determination value may be fixed at a preset specified value or may be varied. When the roll suppression control is performed, the stability of the action of the vehicle 10 is likely to lower as the vehicle body speed VS of the vehicle 10 increases. Therefore, when the determination value is varied, the determination value may be reduced as the vehicle body speed VS is increased.

The determination vehicle body speed VSTh is set as a determination criterion as to whether or not the yaw moment YM1 generated by the execution of the roll suppression control increases. That is, in a case where the roll suppression control is executed when the vehicle body speed VS is greater than or equal to the determination vehicle body speed VSTh, there is a possibility that the degree of lowering in the stability of the action of the vehicle 10 exceeds the allowable range due to the generation of large yaw moment YM1. That is, the determination vehicle body speed VSTh is also an example of the "first predetermined value".

In the present embodiment, even when at least one of the above (condition 1) to (condition 4) is not satisfied, determination may be made that the vehicle 10 gradually turns when the curvature radius of the traveling course of the vehicle 10 is larger than the determination curvature radius. When the curvature radius is larger than the determination curvature radius, it can be determined that the stability of the action of the vehicle 10 is unlikely to lower even if the roll suppression control is performed. The determination curvature radius may be fixed at a preset specified value or may be varied. When the determination curvature radius is varied, the determination curvature radius may be increased as the vehicle body speed VS is increased.

When determination is not made that the vehicle 10 turns gradually in step S11 (NO), the process proceeds to step S14 described later. On the other hand, when determination is made that the vehicle 10 turns gradually (S11: YES), the process proceeds to the next step S12. In step S12, the deceleration slip determination unit 104 calculates the slip amount SLP of each of the wheels FL, FR, RL, and RR. That is, the deceleration slip determination unit 104 calculates a value obtained by subtracting the wheel speed VW of the wheels FL, FR, RL, and RR from the vehicle body speed VS as the slip amount SLP of the wheels FL, FR, RL, and RR. Subsequently, in the next step S13, the deceleration slip determination unit 104 determines whether or not there is a wheel in which the slip amount SLP is greater than or equal to the determination slip amount SLPTh among the wheels FL, FR, RL, and RR. The determination slip amount SLPTh is set as a determination criterion for whether a deceleration slip has occurred in the wheels FL, FR, RL, and RR. That is, it can also be said that, in step S13, determination is made as whether or not a deceleration slip has occurred in at least one of the wheels FL, FR, RL, and RR. The determination slip amount SLPTh may be the same value as a threshold value of the slip amount used when the anti-lock brake control (ABS) is performed, or smaller than the threshold value.

When there is a wheel in which the slip amount SLP is greater than or equal to the determination slip amount SLPTh among the wheels FL, FR, RL, and RR (S13: YES), determination can be made that there is a wheel in which a deceleration slip has occurred, and thus the process proceeds to the next step S14.

In step S14, the stability priority control unit 103 performs the stability priority control. Then, in the next step S15, the control flag FLG is set to OFF. The control flag FLG is set to ON during the execution of the roll suppression control, and is set to OFF when the roll suppression control is not executed. The control flag FLG is set to OFF as an initial value. That is, when the vehicle 10 is not turning, the control flag FLG is set to OFF. When the control flag FLG is set to OFF in step S15, the present processing routine is once terminated.

On the other hand, when there is no wheel in which the slip amount SLP is greater than or equal to the determination slip amount SLPTh among the wheels FL, FR, RL, and RR in step S13 (NO), it means that there is no wheel in which the deceleration slip has occurred, and thus the roll suppression control is performed by the roll suppression control unit 102. That is, first, the process of step S16 is executed. In step S16, whether the control flag FLG is set to OFF is determined. When the control flag FLG is set to ON (step S16: YES), the process proceeds to the next step S17. On the other hand, when the control flag FLG is set to ON (S16: NO), the process proceeds to step S18 without executing the process of step S17.

In step S17, the roll angle $\Phi$ and the roll rate $\Phi R$ of the vehicle 10 are calculated. The roll angle $\Phi$ is calculated based on the stroke amount SS of each of the suspensions 15FL, 15FR, 15RL, and 15RR. When the roll angle sensor is provided in the vehicle 10, the roll angle $\Phi$ of the vehicle 10 may be calculated on the basis of a detection signal from the roll angle sensor. The roll rate $\Phi R$ is calculated by time-differentiating the roll angle $\Phi$. When the roll angle $\Phi$ and the roll rate $\Phi R$ are calculated, the process proceeds to the next step S18.

In step S18, the rear wheel on the inside during turning is selected as the target wheel, and the wheel required braking force BPRTW which is the required braking force on the rear wheel on the inside during turning is calculated as the control amount of the roll suppression control. The wheel required braking force BPRTW is calculated based on the relationship between the roll angle $\Phi$ and the target roll angle $\Phi Th$ and the roll rate $\Phi R$. The target roll angle $\Phi Th$ is a target value of the roll angle $\Phi$ during the execution of the roll suppression control. Therefore, the wheel required braking force BPRTW is calculated so as to increase as the roll angle deviation $\Delta\Phi$, which is a value obtained by subtracting the roll angle $\Phi$ from the target roll angle $\Phi Th$, increases. In addition, assuming that the roll suppression control is not executed, the roll angle $\Phi$ tends to increase as the roll rate $\Phi R$ increases. Therefore, the wheel required braking force BPRTW is calculated so as to increase as the roll rate $\Phi R$ increases.

In the present embodiment, the roll suppression control is performed under a situation where the braking force is applied to the vehicle 10 according to the vehicle required braking force BPRC. In the roll suppression control at the time of vehicle braking, the wheel required braking force BPRTW is calculated based on the relationship between the roll angle $\Phi$ and the target roll angle $\Phi Th$ and the roll rate $\Phi R$ within a range not exceeding the vehicle required braking force BPRC. The wheel required braking force BPRTW calculated in step S18 is larger than the braking force applied to the rear wheel on the inside during turning before the start of the roll suppression control. Therefore, when the roll suppression control is executed, the braking force applied to the rear wheel on the inside during turning is larger than that before the start of the roll suppression control even if the vehicle required braking force BPRC is not changed. That is, in the roll suppression control, the distribution ratio of the braking force with respect to the rear wheel on the inside during turning, which is the target wheel, can be made higher than that when the roll suppression control is not executed. More specifically, in the roll suppression control, the distribution ratio of the braking force with respect to the rear wheel on the inside during turning becomes higher as the roll angle deviation $\Delta\Phi$ becomes larger. In the roll suppression control, the distribution ratio of the braking force with respect to the rear wheel on the inside during turning becomes higher as the roll rate $\Phi R$ becomes larger.

Further, in the present embodiment, the roll suppression control may be executed even when the braking force is not applied to the vehicle 10. The roll suppression control performed under a situation where the braking force is not applied to the vehicle 10 is referred to as "non-braking roll suppression control". In the non-braking roll suppression control as well, similarly to the roll suppression control at the time of vehicle braking, the wheel required braking force BPRTW is calculated based on the relationship between the roll angle $\Phi$ and the target roll angle $\Phi Th$ and the roll rate $\Phi R$.

When the calculation of the wheel required braking force BPRTW is completed, the process proceeds to the next step S19. In step S19, whether or not the vehicle is in automatic driving is determined. When determined that the vehicle is in automatic driving (S19: YES), the process proceeds to step S21 described later. On the other hand, when not determined that the vehicle is in automatic driving (S19: NO), steering is manually performed, and thus the process proceeds to the next step S20.

In step S20, the decrease correction of the wheel required braking force BPRTW calculated in step S18 is performed. That is, a value obtained by multiplying the wheel required braking force BPRTW calculated in step S18 by the correction coefficient is derived as the wheel required braking force BPRTW. In this case, the correction coefficient is a value larger than "0" and smaller than "1". That is, in the roll suppression control when the steering is manually performed, an increase in the distribution ratio of the braking force with respect to the rear wheel on the inside during turning is suppressed as compared with the roll suppression control during the automatic driving. When the decrease correction is performed, the process proceeds to the next step S21.

In step S21, the suppression control amount Z that cancels out the change in the acceleration of the vehicle 10 due to the application of the braking force to the rear wheel on the inside during turning or the increase in the braking force applied to the rear wheel on the inside during turning is calculated. In the roll suppression control at the time of vehicle braking, the sum of braking forces with respect to other wheels other than the rear wheel on the inside during turning is calculated as the suppression control amount Z. That is, a value obtained by subtracting the wheel required braking force BPRTW which is the braking force with respect to the rear wheel on inside during turning from the vehicle required braking force BPRC is calculated as the suppression control amount Z. Therefore, the sum of the wheel required braking force BPRTW and the suppression control amount Z is a value corresponding to the target value XGT of the deceleration of the vehicle 10. That is, when the total braking force having the deceleration of the vehicle 10 as the target value XGT is distributed to each of the wheels FL, FR, RL, and RR, the braking force applied to the rear wheel on the inside during turning becomes larger than that before the execution of the roll suppression control. As a result, the proportion occupied by the braking force with respect to the rear wheel on the inside during turning in the total braking force becomes large as compared with a case where the roll suppression control is not executed. On the other hand, for any of the wheels other than the rear wheel on the inside during turning or the plurality of wheels other than the rear wheel on the inside during turning, the applied braking force is suppressed, and the proportion indicated by the braking force with respect to the wheel in the total braking force becomes smaller than a case where the roll suppression control is not executed.

When the non-braking roll suppression control is performed, the braking force is not applied to the vehicle 10 before the start of the non-braking roll suppression control. In this case, the increase amount of the driving force output from the power source 11 of the vehicle 10 is calculated as the suppression control amount Z so that the driving force input to the front wheels FL and FR, which are the driving wheels, increases by an amount corresponding to the wheel required braking force BPRTW.

Then, when the suppression control amount Z is calculated, the process proceeds to the next step S22. In step S22, the braking device 40, that is, the braking actuator 42 is controlled based on the wheel required braking force BPRTW and the suppression control amount Z. In addition to the braking actuator 42, the power source 11 of the vehicle 10 is also controlled when increasing the driving force output from the power source 11. Then, in the next step S23, the control flag FLG is set to ON. Thereafter, the present processing routine is once terminated.

Next, the operation and effect of the present embodiment will be described with reference to FIGS. 5A-5G. FIGS. 5A-5G illustrate an example of a case where a braking force is applied at the time of turning of the vehicle 10 in automatic driving. In the example illustrated in FIGS. 5A-5G, the braking force is applied to the vehicle 10 at timing T11 while the vehicle 10 is turning, and the vehicle 10 stops at subsequent timing T13.

In FIGS. 5A-5G, the transition of the braking forces BPFL, BPFR, BPRL, and BPRR applied to the wheels FL, FR, RL, and RR in the present embodiment in which the roll suppression control is executed is indicated by a solid line.

On the other hand, the transition of the braking forces BPFL, BPFR, BPRL, and BPRR applied to the wheels FL, FR, RL, and RR in a comparative example in which the roll suppression control is not executed is indicated by a broken line.

As illustrated in FIGS. 5A-5G, when determined that the vehicle 10 gradually turns at timing T11 while the vehicle 10 is turning, the roll suppression control is started. Then, the wheel required braking force BPRTW which is the braking force applied to the rear wheel on the inside during turning which is the target wheel is calculated. At this time, the wheel required braking force BPRTW is set to a value larger than the braking force applied to the other wheels other than the rear wheel on the inside during turning.

Here, in the case of the comparative example, as indicated by broken lines in FIGS. 5A-5G, the braking force applied to the rear wheel on the inside during turning does not become larger than the wheel required braking force BPRTW. Therefore, the anti-lift force FAL generated in the vicinity of the rear wheel on the inside during turning in the rear portion of the vehicle does not become so large. As a result, the rolling motion of the vehicle 10 cannot be suppressed, and the roll angle Φ of the vehicle 10 becomes large.

In this regard, in the present embodiment, a large braking force is applied to the rear wheel on the inside during turning as compared with the case of the comparative example. As a result, a large anti-lift force FAL can be generated in the vicinity of the rear wheel on the inside during turning in the rear portion of the vehicle. Thus, the rolling motion of the vehicle 10 is suppressed. Therefore, when the vehicle 10 gradually turns by automatic driving, the comfort of the occupant of the vehicle 10 can be improved by suppressing the rolling motion of the vehicle 10.

Furthermore, by suppressing change in the roll angle Φ of the vehicle 10 by executing the roll suppression control, a change in the angle of view of the in-vehicle camera 121 can be suppressed. As a result, decrease in accuracy of information obtained from the camera 121 can be suppressed at the time of turning of the vehicle 10.

In such roll suppression control, the suppression control amount Z, that is, the braking force applied to the wheels other than the rear wheel on the inside during turning is adjusted such that the longitudinal acceleration GX of the vehicle 10 becomes the target value XGT of the deceleration. Therefore, the deceleration of the vehicle 10 caused by the increase in the braking force applied to the rear wheel on the inside during turning can be canceled out by the acceleration of the vehicle 10 caused by the decrease in the braking force applied to the other wheels. As a result, the longitudinal acceleration GX of the vehicle 10 can be suppressed from deviating from the target value XGT of the deceleration due to the execution of the roll suppression control.

FIGS. 5A-5G illustrate an example in which the roll suppression control is executed when decelerating the vehicle 10 by applying the braking force. However, the roll suppression control may be executed when the vehicle 10 turns while maintaining the vehicle body speed VS constant, that is, when the target value XGT of the deceleration is "0". That is, the non-braking roll suppression control may be executed. In this case, when braking force is applied to the rear wheel on the inside during turning to suppress the rolling motion of the vehicle 10, the driving force output from the power source 11 of the vehicle 10 is increased. That is, the deceleration of the vehicle 10 caused by the application of the braking force to the rear wheel on the inside during turning can be canceled out by the acceleration of the vehicle 10 caused by the increase in the driving force input to the front wheels FL and FR which are the driving wheels. Therefore, even in this case, the longitudinal acceleration GX of the vehicle 10 can be suppressed from deviating from the target value XGT of the deceleration due to the execution of the non-braking roll suppression control.

When the roll suppression control is executed at the time of turning of the vehicle 10, a deceleration slip may occur in at least one of the wheels FL, FR, RL, and RR. In particular, a relatively large braking force is applied to the rear wheel on the inside during turning although the vertical load input to the rear wheel on the inside during turning is smaller than the vertical load input to the other wheels. As a result, the deceleration slip easily occurs in the rear wheel on the inside during turning. When the deceleration slip occurs in the wheel while the vehicle 10 is turning, the stability of the action of the vehicle 10 is likely to lower. Therefore, in the present embodiment, when a deceleration slip occurs in at least one wheel during the execution of the roll suppression control, the execution of the roll suppression control is terminated.

Specifically, when the roll suppression control is terminated, the stability priority control is started. In the roll suppression control executed in the present embodiment, an oversteer tendency tends to increase in the vehicle 10. Therefore, when a deceleration slip occurs in at least one of the wheels FL, FR, RL, and RR, there is a possibility the vehicle 10 is exhibiting an oversteer tendency. Therefore, even if the vehicle 10 exhibits an oversteer tendency during the execution of the roll suppression control, the oversteer tendency of the vehicle 10 can be reduced by terminating the roll suppression control and executing the stability priority control. As a result, lowering in the stability of the action of the vehicle 10 at the time of turning can be suppressed.

Furthermore, in the present embodiment, the determination in step S11 illustrated in FIG. 4 is performed even during the execution of the roll suppression control. Then, when determination is not made that the vehicle 10 gradually turns, the roll suppression control is terminated and the stability priority control is executed. The oversteer tendency that has occurred at the time of execution of the roll suppression control can be reduced by executing the stability priority control in this manner. As a result, lowering in the stability of the action of the vehicle 10 at the time of turning can be suppressed.

The present embodiment further has the following effects.

(1) When the steering is manually performed by the driver, it is desirable that the roll angle Φ of the vehicle 10 changes to some extent according to the steering from the viewpoint of driver's feeling. Therefore, in the present embodiment, in the roll suppression control in a case where the vehicle 10 turns by manual steering, the wheel required braking force BPRTW is made smaller than that when the roll suppression control is executed in a case where the vehicle 10 turns by automatic driving. Thus, at the time of manual steering, the effect of suppressing the rolling motion of the vehicle 10 accompanying the execution of the roll suppression control is reduced. Therefore, when the vehicle 10 turns by manual steering, the vehicle 10 can be caused to perform the rolling motion according to the steering amount while suppressing a significant change in the roll angle Φ of the vehicle 10.

(2) In the stability priority control executed in the present embodiment, the braking force applied to the rear wheel on the inside during turning is set to a value smaller than that at the time of execution of the roll suppression control but larger than the braking force applied to the other wheels. Thus, even at the time of execution of the stability priority control, the rolling motion of the vehicle 10 can be somewhat suppressed.

(3) In a case where the vehicle 10 is turning, when determination is not made that the vehicle 10 gradually turns, the stability priority control is executed instead of the roll suppression control. Thus, when determination is not made that the vehicle 10 gradually turns, the stability of the action of the vehicle 10 during turning can be enhanced.

Second Embodiment

Figure 6:
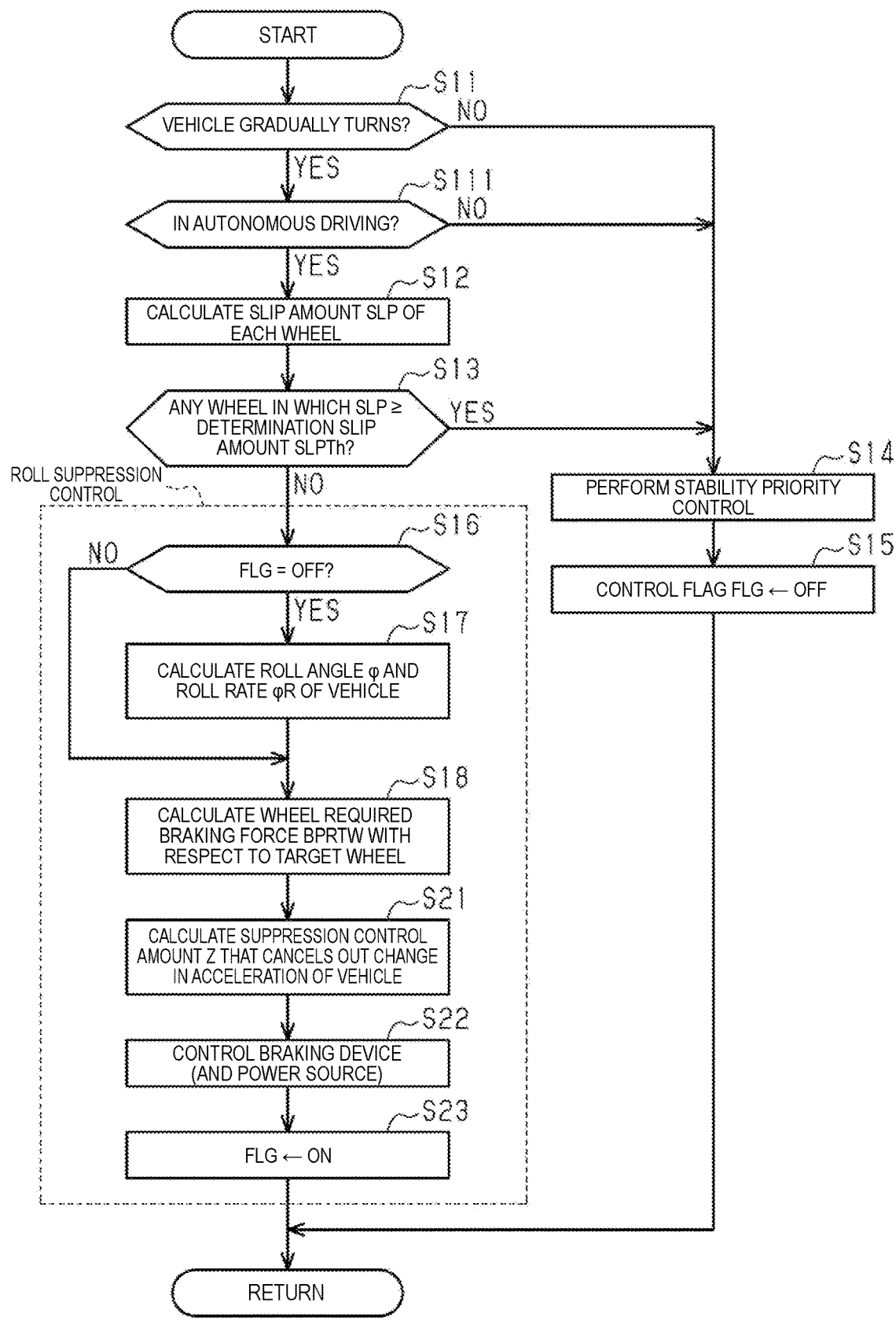
FIG. 6 is a flowchart describing a processing routine executed by a control device in a second embodiment.

Now, a second embodiment of a vehicle action control device will be described with reference to FIG. 6. The second embodiment is different from the first embodiment in that the roll suppression control is not executed at the time of manual steering. Therefore, in the following description, portions different from those of the first embodiment will be mainly described, and the same reference numerals will be denoted to the same or corresponding member configurations as those of the first embodiment, and redundant description will be omitted.

A processing routine executed by the control device 100 serving as an action control device at the time of turning of the vehicle 10 will be described with reference to FIG. 6. Note that this processing routine is repeatedly executed even when the vehicle 10 travels by automatic driving or when the vehicle 10 travels by manual driving.

In this processing routine, when the turning state determination unit 101 does not determine that the vehicle 10 gradually turns in step S11 (NO), the process proceeds to step S14. On the other hand, when the turning state determination unit 101 determines that the vehicle 10 turns gradually (S11: YES), the process proceeds to the next step S111. In step S111, whether or not the vehicle is in automatic traveling is determined. When steering is performed by the driver, the vehicle is not in automatic traveling. When determination is not made that the vehicle is in automatic traveling (S111: NO), the process proceeds to step S14. On the other hand, when determination is made that the vehicle is in automatic traveling (S111: YES), the process proceeds to step S12.

In step S12, the deceleration slip determination unit 104 calculates the slip amount SLP of each of the wheels FL, FR, RL, and RR. Subsequently, in the next step S13, when there is a wheel in which the slip amount SLP becomes greater than or equal to the determination slip amount SLPTh among the wheels FL, FR, RL, and RR (YES), the process proceeds to the next step S14.

In step S14, the stability priority control unit 103 performs the stability priority control. Then, in the next step S15, the control flag FLG is set to OFF. Thereafter, the present processing routine is once terminated.

On the other hand, when there is no wheel in which the slip amount SLP is greater than or equal to the determination slip amount SLPTh among the wheels FL, FR, RL, and RR in step S13 (NO), the roll suppression control unit 102 performs the roll suppression control. That is, first, the process of step S16 is executed. When the control flag FLG is set to OFF in step S16 (YES), the process proceeds to step S17. On the other hand, when the control flag FLG is set to ON (S16: NO), the process proceeds to step S18.

In step S17, the roll angle Φ and the roll rate ΦR of the vehicle 10 are calculated, and in the next step S18, the wheel required braking force BPRTW with respect to the rear wheel on the inside during turning, which is the target wheel, is calculated as the control amount of the roll suppression control. Then, in the next step S21, the suppression control amount Z is calculated. Subsequently, in step S22, the braking device 40, that is, the braking actuator 42 is controlled based on the wheel required braking force BPRTW and the suppression control amount Z. In addition to the braking actuator 42, the power source 11 of the vehicle 10 is also controlled when increasing the driving force output from the power source 11. Then, in step S23, the control flag FLG is set to ON. Thereafter, the present processing routine is once terminated.

In the present embodiment, unlike the case of the first embodiment, when the vehicle 10 turns by the steering of the driver, the roll suppression control is not performed even if determination is made that the vehicle 10 gradually turns. Thus, it is possible to give the driver the feeling that the vehicle action is appropriately changed by the steering by causing the vehicle 10 to perform the rolling motion according to the manual steering.

Third Embodiment

Hereinafter, a third embodiment of a vehicle action control device will be described with reference to FIGS. 7, 8 and 9A-9G. The third embodiment is different from the first embodiment and the second embodiment in that regenerative braking force and friction braking force are coordinated. Therefore, in the following description, portions different from those of the first embodiment and the second embodiment will be mainly described, and the same reference numerals will be denoted to the same or corresponding member configurations as those of the first embodiment and the second embodiment, and redundant description will be omitted.

Figure 7:
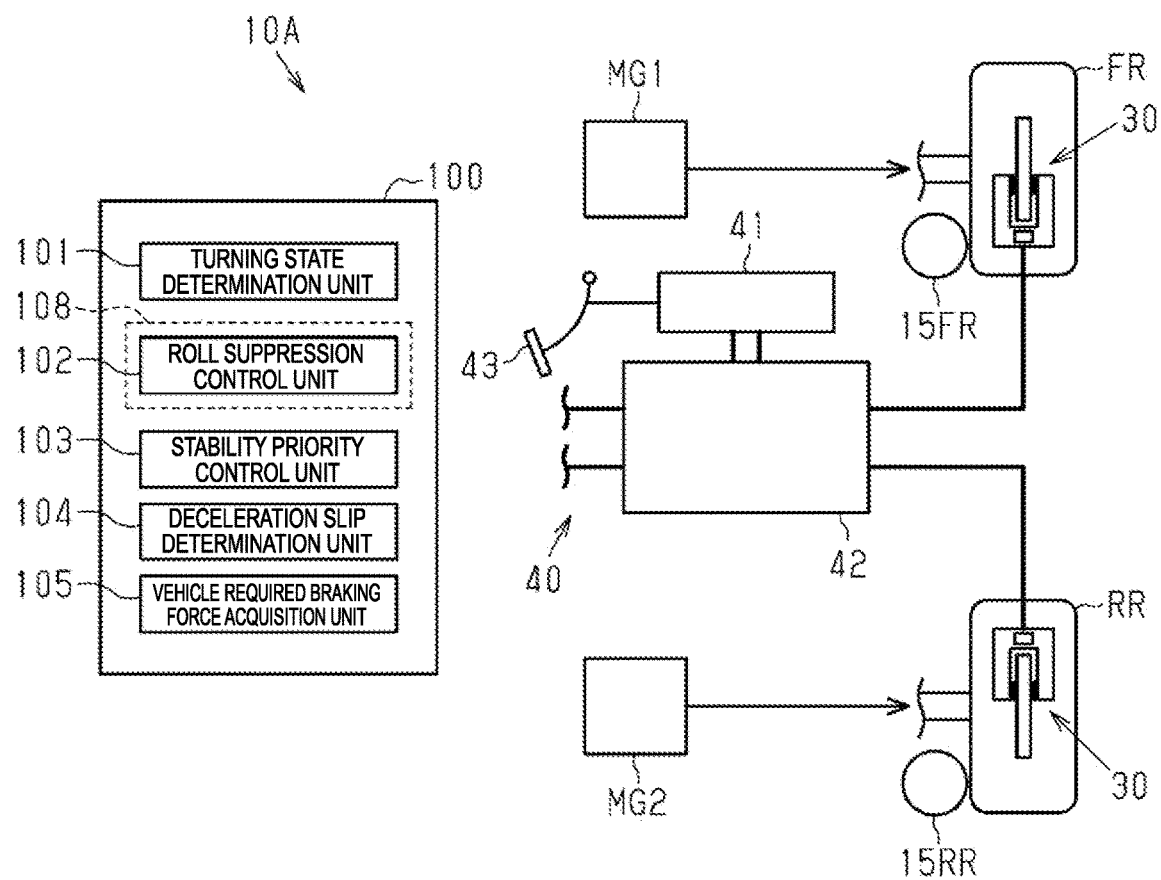
FIG. 7 is a view illustrating a functional configuration of a control device serving as a third embodiment of a vehicle action control device and a part of a configuration of a vehicle equipped with the control device.

FIG. 7 illustrates a vehicle 10A including the control device 100. The vehicle 10A includes a motor generator MG1 for the front wheel and a motor generator MG2 for the rear wheel in addition to the braking device 40. The motor generator MG1 can apply a driving force to both front wheels FL and FR when accelerating the vehicle 10A, and can apply a regenerative braking force BPR to both front wheels FL and FR when decelerating the vehicle 10A. The regenerative braking force BPR corresponding to the power generation amount of the motor generator MG1 is applied to each of the front wheels FL and FR. At this time, the magnitude of the regenerative braking force BPR applied to the left front wheel FL is equal to the magnitude of the regenerative braking force BPR applied to the right front wheel FR. Similarly, the motor generator MG2 can apply a driving force to both rear wheels RL and RR when accelerating the vehicle 10A, and can apply a regenerative braking force BPR to both rear wheels RL and RR when decelerating the vehicle 10A. The regenerative braking force BPR corresponding to the power generation amount of the motor generator MG2 is applied to each of the rear wheels RL and RR. At this time, the magnitude of the regenerative braking force BPR applied to the left rear wheel RL is equal to the magnitude of the regenerative braking force BPR applied to the right rear wheel RR. In the present embodiment, the motor generator MG1 is an example of a "regenerative device" that adjusts the regenerative braking force BPR applied to both front wheels FL and FR. Furthermore, the motor generator MG2 is an example of a "regenerative device" that adjusts the regenerative braking force BPR applied to the rear wheels RL and RR.

Next, a processing routine executed by the control device 100 when the vehicle 10A turns will be described with reference to FIG. 8. This processing routine is repeatedly executed as long as the braking force is applied to the vehicle 10A while the vehicle is turning, even when the vehicle 10A travels by automatic driving or when the vehicle 10A travels by manual driving.

Figure 8:
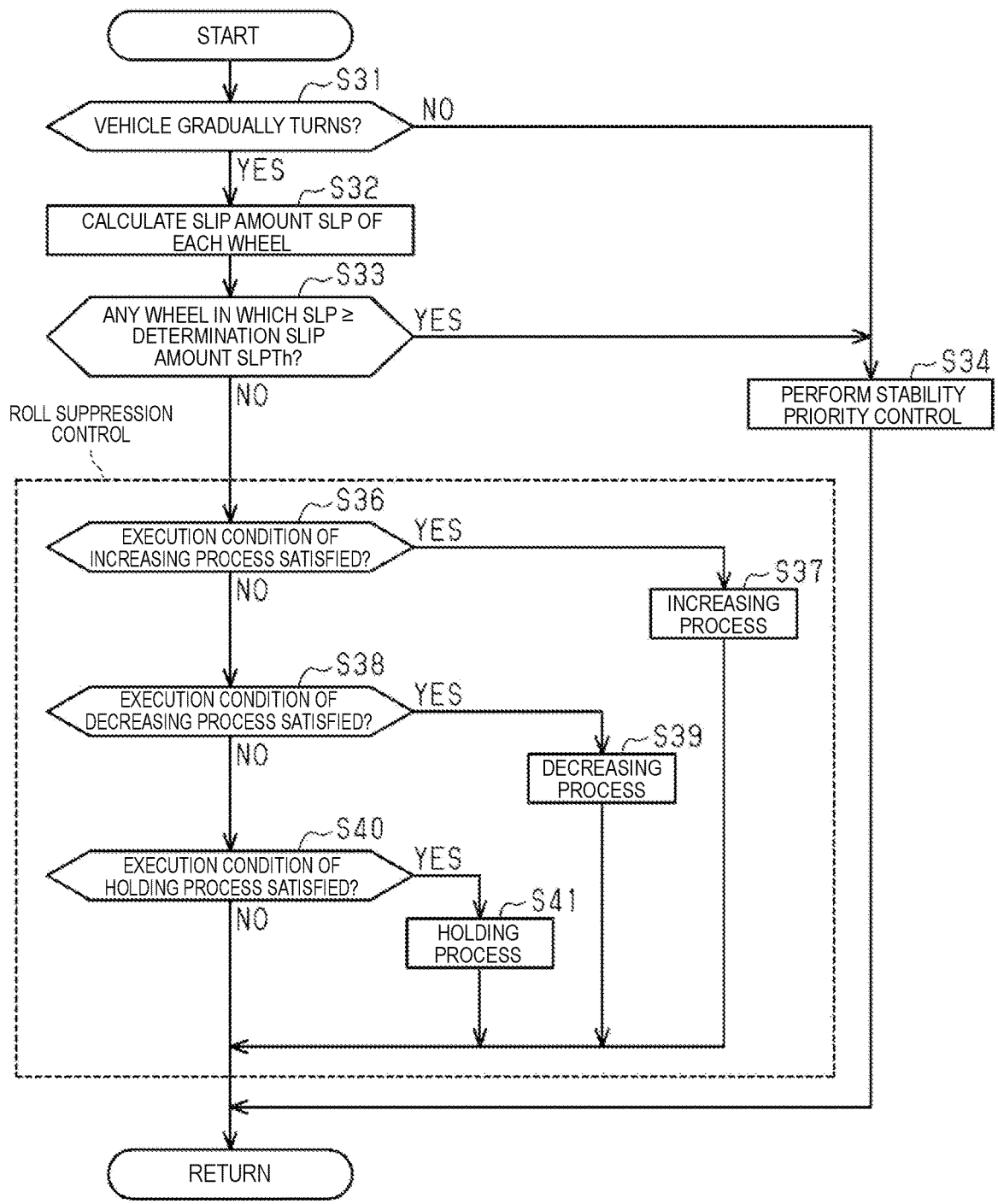
FIG. 8 is a flowchart describing a processing routine executed by a control device in the third embodiment.

As illustrated in FIG. 8, in the present processing routine, in step S31, the turning state determination unit 101 determines whether or not the vehicle 10 gradually turns as in step S11 described above. When determination is not made that the vehicle 10 turns gradually in step (S31: NO), the process proceeds to step S34 described later. On the other hand, when determination is made that the vehicle 10 gradually turns (S31: YES), the process proceeds to the next step S32. In step S32, the deceleration slip determination unit 104 calculates the slip amount SLP of each of the wheels FL, FR, RL, and RR. Subsequently, in step S33, the deceleration slip determination unit 104 determines whether or not there is a wheel in which the slip amount SLP is greater than or equal to the determination slip amount SLPTh among the wheels FL, FR, RL, and RR. When there is a wheel in which the slip amount SLP is greater than or equal to the determination slip amount SLPTh among the wheels FL, FR, RL, and RR (S33: YES), determination can be made that there is a wheel in which a deceleration slip has occurred, and thus the process proceeds to the next step S34.

In step S34, the stability priority control unit 103 performs the stability priority control. The vehicle 10A can apply the regenerative braking force BPR to each of the wheels FL, FR, RL, and RR. Thus, in the stability priority control, regenerative braking force may be applied to at least one of the front wheels FL and FR and the rear wheels RL and RR. When the stability priority control is performed in this manner, the present processing routine is once terminated.

On the other hand, when there is no wheel in which the slip amount SLP is greater than or equal to the determination slip amount SLPTh among the wheels FL, FR, RL, and RR in step S33 (NO), it means that there is no wheel in which the deceleration slip has occurred, and thus the roll suppression control is performed by the roll suppression control unit 102. That is, first, the process of step S36 is executed. In step S36, determination is made on whether or not an execution condition of an increasing process to be described later is satisfied. For example, the execution condition includes that the longitudinal acceleration GX is decreasing. For example, when the decreasing speed of the longitudinal acceleration GX is higher than or equal to the determination decreasing speed, determination can be made that the longitudinal acceleration GX is decreasing. The determination decreasing speed is set as a determination criterion for whether the deceleration of the vehicle 10A has increased. Therefore, when the decreasing speed of the longitudinal acceleration GX is less than the determination decreasing speed, determination cannot be made that the longitudinal acceleration GX is decreasing. Then, when determination is made that the execution condition of the increasing process is satisfied (S36: YES), the process proceeds to the next step S37.

In step S37, an increasing process of the roll suppression control is executed. In the increasing process, the roll suppression control unit 102 increases the distribution ratio of the braking force with respect to the target wheel among the wheels FL, FR, RL, and RR, and decreases the distribution ratio of the braking force with respect to the wheels other than the target wheel among the wheels FL, FR, RL, and RR.

An example of the increasing process will be described with reference to FIGS. 9A-9G. A period from timing T21 to timing T22 in FIGS. 9A-9G is an execution period of the increasing process. In FIGS. 9D, 9E, 9F, and 9G, broken lines indicate the transition of the regenerative braking force BPR in a case where the roll suppression control is not performed. A thin solid line indicates the transition of the regenerative braking force BPR in a case where the roll suppression control is performed. That is, since the vehicle required braking force BPRC is increased in the period from timing T21 to timing T22, the braking force applied to each of the wheels FL, FR, RL, and RR is increased. However, in the increasing process, the increasing speed of the regenerative braking force BPR applied to each of the wheels FL, FR, RL, and RR is small compared to that when the roll suppression control is not performed. When the difference between the vehicle required braking force BPRC and the total regenerative braking forces BPR applied to each of the wheels FL, FR, RL, and RR is assumed as an insufficient braking force, in the increasing process, the friction braking force BPF applied to the target wheel is increased as the insufficient braking force becomes larger.

In the present embodiment, both the rear wheel on the inside during turning and the front wheel on the outside during turning are target wheels. Therefore, only the regenerative braking force BPR of the friction braking force BPF and the regenerative braking force BPR is applied to the rear wheel on the outside during turning and the front wheel on the inside during turning, which are not the target wheel, while both the friction braking force BPF and the regenerative braking force BPR are applied to the rear wheel on the inside during turning and the front wheel on the outside during turning. That is, in the increasing process, the braking actuator 42 and the motor generators MG1 and MG2 are controlled so that the sum of the total regenerative braking forces BPR applied to the wheels FL, FR, RL, and RR and the total friction braking forces BPF applied to the rear wheel on the inside during turning and the front wheel on the outside during turning becomes equal to the vehicle required braking force BPRC. Thus, while the braking force applied to the target wheel is increased, the braking force applied to the wheel that is not the target wheel is decreased. In this case, the required value of the friction braking force BPF applied to the target wheel is an example of the "control amount of the roll suppression control".

Incidentally, in view of the geometry of the suspensions 15FL and 15FR for the front wheels and the suspensions 15RL and 15RR for the rear wheels, the effect of suppressing the rolling motion of the vehicle 10A can be enhanced as the braking force applied to the rear wheel on the inside during turning is increased. Thus, in order to suppress the rolling motion of the vehicle 10A, it is preferable to make the friction braking force BPF applied to the rear wheel on the inside during turning larger than the friction braking force BPF applied to the front wheel on the outside during turning. However, when the difference between the braking force BP applied to the rear wheel on the inside during turning and the braking force BP applied to the front wheel on the outside during turning is large, the yaw moment generated by the execution of the increasing process becomes large, and lowering in stability of the action of the vehicle 10A becomes a concern. Therefore, the friction braking force BPF applied to the rear wheel on the inside during turning and the friction braking force BPF applied to the front wheel on the outside during turning are set so that the degree of lowering in the stability of the action of the vehicle 10A accompanying the execution of the increasing process can be kept within an allowable range.

Returning back to FIG. 8, when the increasing process is executed, the present processing routine is once terminated. On the other hand, when determination is not made that the execution condition is satisfied in step S36 (NO), the process proceeds to step S38 described later. In step S38, determination is made on whether or not an execution condition of a decreasing process to be described later is satisfied. For example, the execution condition includes both that determination can be made that the longitudinal acceleration GX is not decreased and that the friction braking force BPF applied to the target wheel is larger than the switching determination value BPFTh. In the present embodiment, "0" is set as the switching determination value BPFTh. For example, when the decreasing speed of the longitudinal acceleration GX is less than the determination decreasing speed, determination can be made that the longitudinal acceleration GX is not decreased. When both that determination can be made that the longitudinal acceleration GX is not decreased and that the friction braking force BPF applied to the target wheel is larger than the switching determination value BPFTh are satisfied, determination is made that the execution condition of the decreasing process is satisfied (S38: YES), and the process proceeds to the next step S39.

In step S39, a decreasing process of the roll suppression control is executed. In the decreasing process, the roll suppression control unit 102 reduces the distribution ratio of the braking force applied to the target wheel by reducing the friction braking force BPF applied to the target wheel to the switching determination value BPFTh. In addition, in the decreasing process, the roll suppression control unit 102 increases the distribution ratio of the braking force applied to the wheel that is not the target wheel by increasing the regenerative braking force BPR applied to each of the wheels FL, FR, RL, and RR.

An example of the decreasing process will be described with reference to FIGS. 9A-9G. A period from timing T22 to timing T23 in FIGS. 9A-9G is an execution period of the decreasing process. In the example illustrated in FIGS. 9A-9G, the vehicle required braking force BPRC is not increased in the period from timing T22 to timing T23. In the decreasing process, the friction braking force BPF applied to the rear wheel on the inside during turning and the friction braking force BPF applied to the front wheel on the outside during turning are decreased. The decreasing speed of the friction braking force BPF at this time is larger than the increasing speed of the friction braking force BPF at the time of execution of the increasing process. The decreasing speed of the friction braking force BPF at the time of execution of the decreasing process may be the same as the increasing speed or smaller than the increasing speed of the friction braking force BPF at the time of execution of the increasing process.

In addition, in the decreasing process, the regenerative braking force BPR applied to each of the wheels FL, FR, RL, and RR is increased with the decrease in the friction braking force BPF applied to the rear wheel on the inside during turning and the friction braking force BPF applied to the front wheel on the outside during turning. Thus, a state in which the total braking forces applied to the wheels FL, FR, RL, and RR is equal to the vehicle required braking force BPRC is maintained.

Returning back to FIG. 8, when the decreasing process is executed, the present processing routine is once terminated. On the other hand, when at least one of the determination that the longitudinal acceleration GX is not decreased and the determination that the friction braking force BPF applied to the target wheel is larger than the switching determination value BPFTh is not satisfied in step S38, determination is not made that the execution condition is satisfied (NO), and the process proceeds to step S40 described later. In step S40, whether or not an execution condition of a holding process to be described later is satisfied is determined. For example, the execution condition includes both that determination can be made that the longitudinal acceleration GX is not decreased and that the friction braking force BPF applied to the target wheel is less than or equal to the switching determination value BPFTh. When both that determination can be made that the longitudinal acceleration GX is not decreased and that the friction braking force BPF applied to the target wheel is less than or equal to the switching determination value BPFTh are satisfied, determination is made that the execution condition of the holding process is satisfied (S40: YES), and the process proceeds to the next step S41. On the other hand, when at least one of the determination that the longitudinal acceleration GX is not decreased and that the friction braking force BPF applied to the target wheel is less than or equal to the switching determination value BPFTh is not satisfied, determination is not made that the execution condition is satisfied (S40: NO), and the present processing routine is once terminated.

In step S41, a holding process of the roll suppression control is executed. In the holding process, the roll suppression control unit 102 holds the friction braking force BPF applied to the target wheel in a state of being less than or equal to the switching determination value BPFTh, and holds a state in which the total braking forces BP applied to the wheels FL, FR, RL, and RR is equal to the vehicle required braking force BPRC. In the present embodiment, "0" is set as the switching determination value BPFTh. Therefore, all the friction braking forces BPF applied to the target wheel by the decreasing process can be replaced with the regenerative braking force BPR. Then, the present processing routine is once terminated.

In a case where the regenerative braking force BPR is applied to the wheels FL, FR, RL, and RR to decelerate the vehicle 10A, interchanging control of interchanging the regenerative braking force BPR with the friction braking force BPF is performed when the vehicle body speed VS decreases to the interchanging determination speed VSTh1. That is, as shown in FIGS. 9A-9G, when the vehicle body speed VS reaches the interchanging determination speed VSTh1 at timing T24, determination is made that the start condition of the interchanging control is satisfied, the roll suppression control is terminated, and the interchanging control is started.

Next, the operation and effect of the present embodiment will be described with reference to FIGS. 9A-9G. The example illustrated in FIGS. 9A-9G is a case where the braking force is applied to the vehicle 10A when the vehicle 10A is turning to either the right or the left. That is, the turning direction of the vehicle 10A does not change during deceleration of the vehicle 10A.

As illustrated in FIGS. 9A-9G, the braking force is applied to the vehicle 10 from timing T21 while the vehicle 10A is turning. At this time, when determination is made that the vehicle 10A is gradually turning and there is no wheel in which the slip amount SLP is greater than or equal to the determination slip amount SLPTh, the execution of the roll suppression control is started. Then, in the period from timing T21 to timing T22, the braking force BP applied to the rear wheel on the inside during turning, which is the target wheel, that is, the total of the friction braking force BPF and the regenerative braking force BPR is increased by the execution of the increasing process. Furthermore, the braking force BP applied to the front wheel on the outside during turning which is the target wheel, that is, the total of the friction braking force BPF and the regenerative braking force BPR is increased. The anti-lift force generated in the vicinity of the rear wheel on the inside during turning in the rear portion of the vehicle can be increased as compared with when the roll suppression control is not performed by increasing the braking force applied to the rear wheel on the inside during turning. In addition, the anti-dive force generated in the vicinity of the front wheel on the outside during turning in the front portion of the vehicle can be increased as compared with when the roll suppression control is not performed by increasing the braking force applied to the front wheel on the outside during turning. Thus, in the present embodiment, even when the regenerative braking force is applied to the vehicle 10A, the rolling motion at the time of turning of the vehicle can be suppressed, and furthermore, the comfort of the occupant of the vehicle 10A at the time of turning of the vehicle can be improved.

In the present embodiment, the braking forces on the rear wheel on the inside during turning and the front wheel on the outside during turning disposed diagonally are increased. Therefore, the yaw moment generated by the increase in the braking force applied to the rear wheel on the inside during turning can be canceled out by the yaw moment generated by the increase in the braking force applied to the front wheel on the outside during turning. Thus, lowering in the stability of the action of the vehicle 10A during turning due to the execution of the roll suppression control can be suppressed.

In the increasing process, the regenerative braking force BPR applied to each of the wheels FL, FR, RL, and RR is decreased by an amount corresponding to the increase in the friction braking force BPF applied to the target wheel. Thus, change in the longitudinal acceleration GX of the vehicle 10A due to the execution of the roll suppression control can be suppressed.

In the roll suppression control performed in the present embodiment, in the period from timing T22 to timing T23 after the friction braking force BPF applied to the target wheel is increased by the execution of the increasing process, the friction braking force BPF applied to the target wheel is decreased by the execution of the decreasing process. The regenerative braking force BPR applied to each of the wheels FL, FR, RL, and RR increases with decrease in the friction braking force BPF. By executing the decreasing process and starting the holding process from timing T23 in this manner, it is possible to suppress decrease in the recovery efficiency of the regenerative energy at the time of braking of the vehicle 10A.

Fourth Embodiment

Hereinafter, a fourth embodiment of a vehicle action control device will be described with reference to FIGS. 10A-10G. The fourth embodiment is different from the third embodiment in the content of the roll suppression control. Therefore, in the following description, portions different from those of the third embodiment will be mainly described, and the same reference numerals will be denoted to the same or corresponding member configurations as those of each of the above embodiments, and redundant description will be omitted.

The roll suppression control performed in the present embodiment includes an increasing process, a decreasing process, and a holding process. Then, as described in the third embodiment, when the braking force BP is applied to the vehicle 10A while the vehicle is turning, determination is made that the vehicle 10A is gradually turning (S31 of FIG. 8: YES), and when there is no wheel in which the slip amount SLP is greater than or equal to the determination slip amount SLPTh among the wheels FL, FR, RL, and RR (S32 of FIG. 8: NO), the roll suppression control is performed.

When the execution condition of the increasing process is satisfied, the increasing process is executed. When the execution condition of the decreasing process is satisfied under a situation where the execution condition of the increasing process is not satisfied, the decreasing process is executed. When the execution condition of the holding process is satisfied under a situation where neither the execution condition of the increasing process nor the execution condition of the decreasing process is satisfied, the holding process is executed.

However, the content of the execution condition of the increasing process is different from that of the third embodiment. That is, as illustrated in FIGS. 10A-10G, the execution condition of the increasing process includes that the absolute value of the lateral acceleration GY of the vehicle 10A is increasing. For example, when the increasing speed of the absolute value of the lateral acceleration GY is greater than or equal to a first determination speed, determination can be made that the absolute value of the lateral acceleration GY is increasing. Note that the execution condition of the increasing process in the present embodiment does not include that determination can be made that the longitudinal acceleration GX of the vehicle 10A is decreasing.

The content of the execution condition of the decreasing process is also different from that of the third embodiment. That is, the execution condition of the decreasing process includes that the absolute value of the lateral acceleration GY of the vehicle 10A is decreasing. For example, when the decreasing speed of the absolute value of the lateral acceleration GY is greater than or equal to a second determination speed, determination can be made that the absolute value of the lateral acceleration GY is decreasing. Note that the execution condition of the decreasing process in the present embodiment does not include that determination can be made that the longitudinal acceleration GX is not decreasing.

The content of the execution condition of the holding process is also different from that of the third embodiment. That is, the execution condition of the holding process includes that determination can be made that the lateral acceleration GY of the vehicle 10A is not changed. For example, when the increasing speed of the absolute value of the lateral acceleration GY is greater than or equal to the first determination speed and the decreasing speed of the absolute value of the lateral acceleration GY is greater than or equal to the second determination speed, determination can be made that the lateral acceleration GY is not changed. Note that the execution condition of the decreasing process in the present embodiment does not include that determination can be made that the longitudinal acceleration GX is not decreasing.

Next, the operation and effect of the present embodiment will be described with reference to FIGS. 10A-10G. The example illustrated in FIGS. 10A-10G is a case where the turning direction of the vehicle 10A is changed during vehicle braking, such as a case where the vehicle 10A changes lanes. In FIGS. 10D, 10E, 10F and 10G, a broken line shows a transition of the regenerative braking force BPR when the roll suppression control is not performed, and a thin solid line shows a transition of the regenerative braking force BPR when the roll suppression control is performed. A thick solid line shows a transition of the friction braking force BPF when the roll suppression control is performed.

As illustrated in FIGS. 10A-10G, the braking force to the vehicle 10A is applied from timing T31. In the example illustrated in FIGS. 10A-10G, the regenerative braking force BPR is applied to each of the wheels FL, FR, RL, and RR. Then, a yaw moment is generated in the vehicle 10A such that the lateral acceleration GY of the vehicle 10A changes in the positive direction from timing T32. Then, the lateral acceleration GY increases.

In the present embodiment, the execution of the roll suppression control is started from timing T32. That is, in the period from timing T32 to timing T33, the execution condition of the increasing process is satisfied, and thus the increasing process is executed. In the increasing process, the regenerative braking force BPR applied to each of the wheels FL, FR, RL, and RR is reduced, and the friction braking force BPF applied to the target wheel is increased. In the example illustrated in FIGS. 10A-10G, both the rear wheel on the inside during turning and the front wheel on the outside during turning are target wheels, so that each of the friction braking force BPF applied to the rear wheel on the inside during turning and the friction braking force BPF applied to the front wheel on the outside during turning are increased. Thus, the braking force applied to the rear wheel on the outside during turning that is not the target wheel and the braking force applied to the front wheel on the inside during turning are decreased, and the braking force applied to the rear wheel on the inside during turning and the braking force applied to the front wheel on the outside during turning are increased. Then, by increasing the braking force applied to the rear wheel on the inside during turning, the anti-lift force generated in the vicinity of the rear wheel on the inside during turning in the rear portion of the vehicle can be increased as compared with when the roll suppression control is not performed. In addition, by increasing the braking force applied to the front wheel on the outside during turning, the anti-dive force generated in the vicinity of the front wheel on the outside during turning in the front portion of the vehicle can be increased as compared with when the roll suppression control is not performed. Thus, in the present embodiment, even when the regenerative braking force is applied to the vehicle 10A, the rolling motion at the time of turning of the vehicle can be suppressed, and furthermore, the comfort of the occupant of the vehicle 10A at the time of turning of the vehicle can be improved.

In the example illustrated in FIGS. 10A-10G, a yaw moment in a direction in which the lateral acceleration GY decreases is generated in the vehicle 10A from timing T33. As a result, the absolute value of the lateral acceleration GY becomes small, and hence the execution condition of the decreasing process is satisfied, the increasing process is terminated, and the decreasing process is executed. The decrease in the absolute value of the lateral acceleration GY means that the centrifugal force acting on the vehicle 10A decreases. That is, the force for suppressing the rolling motion of the vehicle 10A may be reduced. The friction braking force BPF applied to the rear wheel on the inside during turning and the friction braking force BPF applied to the front wheel on the outside during turning are respectively decreased by the execution of the decreasing process. As the friction braking force BPF decreases, the regenerative braking force BPR applied to each of the wheels FL, FR, RL, and RR increases. The rolling motion of the vehicle 10A is adjusted by decreasing the braking force applied to the target wheel in accordance with the reduction in the absolute value of the lateral acceleration GY.

Then, at timing T34, the sign of the lateral acceleration GY is reversed. That is, the absolute value of the lateral acceleration GY increases from timing T34. Then, the execution condition of the increasing process is satisfied, so that the decreasing process is terminated and the increasing process is started. The turning direction of the vehicle 10A after timing T34 is opposite to the turning direction of the vehicle 10A before timing T34. Therefore, in the increasing process started from timing T34, a wheel different from that at the time of execution of the increasing process started from timing T32 is selected as the target wheel. For example, when the right front wheel FR and the left rear wheel RL are selected as the target wheels at the time of execution of the increasing process started from timing T32, the left front wheel FL and the right rear wheel RR are selected as the target wheels in the increasing process started from timing T34.

In the increasing process started from timing T34, each of the friction braking force BPF applied to the rear wheel on the inside during turning and the friction braking force BPF applied to the front wheel on the outside during turning are increased. Thus, the braking force applied to the rear wheel on the outside during turning that is not the target wheel and the braking force applied to the front wheel on the inside during turning are decreased, and the braking force applied to the rear wheel on the inside during turning and the braking force applied to the front wheel on the outside during turning are increased. As a result, the rolling motion during the turning of the vehicle can be suppressed.

From timing T35, a yaw moment in a direction in which the lateral acceleration GY increases is generated in the vehicle 10A. As a result, the absolute value of the lateral acceleration GY becomes small, and hence the execution condition of the decreasing process is satisfied, the increasing process is terminated, and the decreasing process is executed. Then, the friction braking force BPF applied to the rear wheel on the inside during turning and the friction braking force BPF applied to the front wheel on the outside during turning are decreased by the execution of the decreasing process. As the friction braking force BPF decreases, the regenerative braking force BPR applied to each of the wheels FL, FR, RL, and RR increases. The rolling motion of the vehicle 10A is adjusted by decreasing the braking force applied to the target wheel in accordance with the reduction in the absolute value of the lateral acceleration GY.

Then, the lateral acceleration GY hardly changes from timing T36. That is, since the state in which the change speed of the lateral acceleration GY is less than or equal to the threshold value is held, determination is made that the absolute value of the lateral acceleration GY is not changed. Then, since the holding condition is satisfied, the decreasing process is terminated and the holding process is started. In the holding process, a state in which the friction braking force BPF applied to the target wheel is less than or equal to the switching determination value BPFTh is held, and a state in which the total regenerative braking forces BPR applied to the wheels FL, FR, RL, RR is equal to the vehicle required braking force BPRC is held.

Note that the execution condition of the interchanging control is satisfied at timing T37.

Therefore, the roll suppression control is terminated, and the execution of the interchanging control is started.

Fifth Embodiment

Hereinafter, a fifth embodiment of a vehicle action control device will be described with reference to FIGS. 11, 12 and 13A-13G. The fifth embodiment is different from each of the above embodiments in a method of adjusting the rolling motion during the turning of the vehicle. Therefore, in the following description, portions different from those of the above embodiments will be mainly described, and the same reference numerals will be denoted to the same or corresponding member configurations as those of the above embodiments, and redundant description will be omitted.

Figure 11:
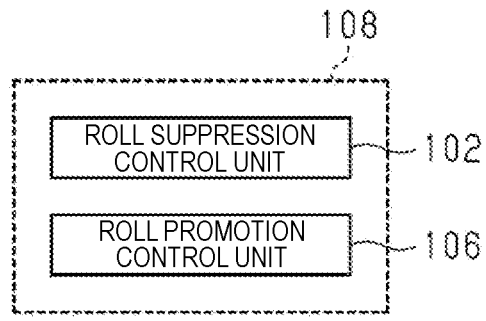
FIG. 11 is a block diagram illustrating a functional configuration of a roll control unit in a control device serving as a fifth embodiment of a vehicle action control device.

As illustrated in FIG. 11, the roll control unit 108 includes a roll promotion control unit 106 in addition to the roll suppression control unit 102. The roll promotion control unit 106 performs the roll promotion control when the turning state determination unit 101 determines that the vehicle 10 gradually turns. The roll promotion control is different from the roll suppression control and is a control that promotes the rolling motion of the vehicle 10A. The roll promotion control is a control that is performed when the vehicle required braking force BPRC is decreased due to a decrease in the braking operation amount by the driver, and the like.

Here, as a result of conducting various experiments and simulations, the inventor of the present application obtained knowledge that when the vehicle braking force is decreased at the time of turning of the vehicle 10A to which the braking force is applied, it is better to promote the rolling motion instead of suppressing the rolling motion in order to improve the comfort of the occupant of the vehicle 10A. Therefore, in the present embodiment, the roll promotion control is performed when the vehicle required braking force BPRC is decreased at the time of turning of the vehicle 10A to which the braking force is applied.

Next, with reference to FIG. 12, a processing routine executed by the control device 100 when the roll promotion control is performed at the time of turning of the vehicle 10A will be described. Note that this processing routine is repeatedly executed even when the vehicle 10A travels by automatic driving or when the vehicle 10A travels by manual driving.

Figure 12:
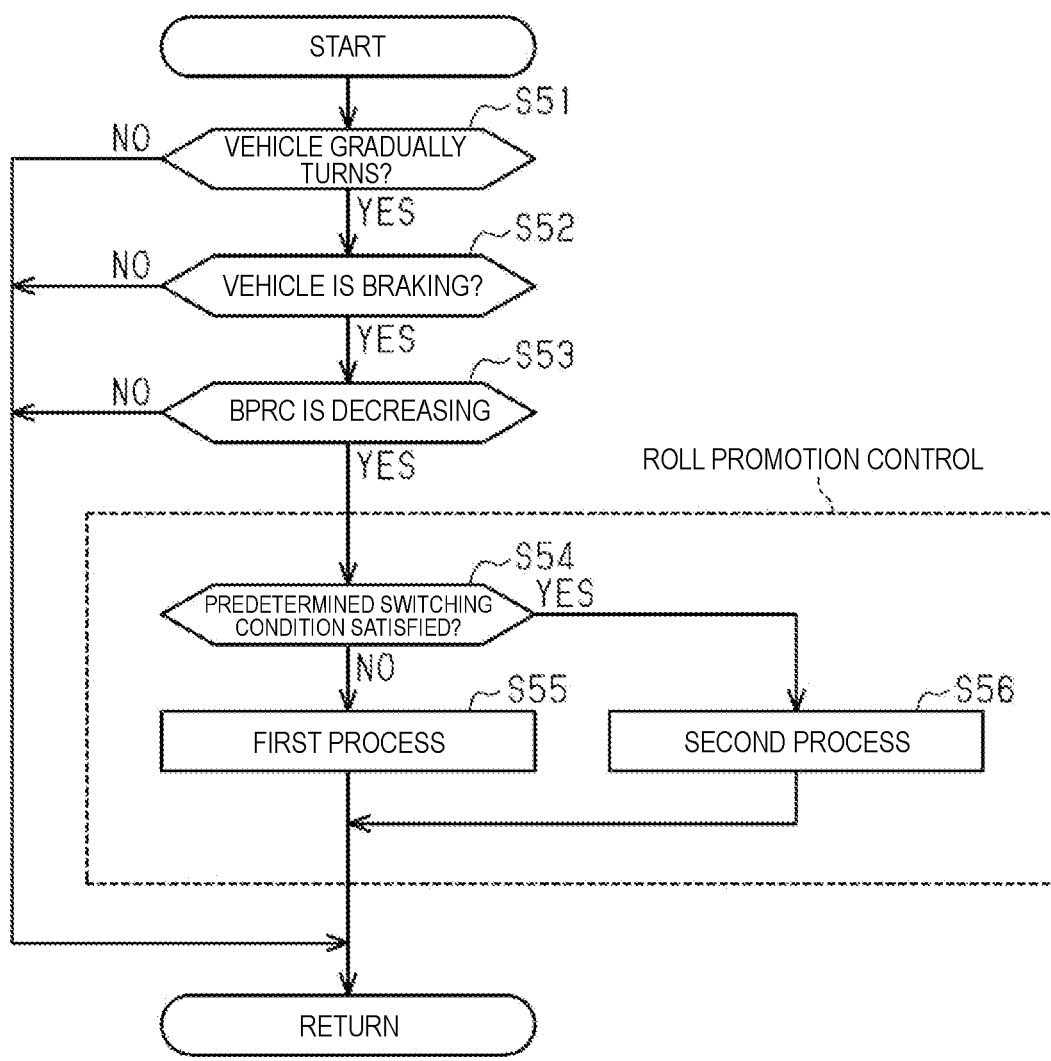
FIG. 12 is a flowchart describing a processing routine executed by a control device in the fifth embodiment.

As illustrated in FIG. 12, in the present processing routine, in step S51, the turning state determination unit 101 determines whether or not the vehicle 10A gradually turns, as in step S11. When determination is made that the vehicle 10A gradually turns (S51: YES), the process proceeds to the next step S52. In step S52, whether or not a braking force is applied to the vehicle 10A is determined. When the vehicle required braking force BPRC is larger than "0", determination is made that the braking force is applied to the vehicle 10A. On the other hand, when the vehicle required braking force BPRC is equal to "0", determination is not made that the braking force is applied to the vehicle 10A. Then, when determination is made that the braking force is applied to the vehicle 10A (S52: YES), the process proceeds to the next step S53. In step S53, whether or not the vehicle required braking force BPRC is decreasing is determined. For example, when the decreasing speed of the vehicle required braking force BPRC is greater than or equal to the determination speed, determination is made that the vehicle required braking force BPRC is decreasing. On the other hand, when the decreasing speed of the vehicle required braking force BPRC is less than the determination speed, determination is not made that the vehicle required braking force BPRC is decreasing. When determination is made that the vehicle required braking force BPRC is decreasing (S53: YES), the roll promotion control unit 106 performs the roll promotion control.

The roll promotion control performed in the present embodiment includes a first process and a second process executed after the first process. Therefore, in the roll promotion control, whether or not a predetermined switching condition is satisfied is determined in step S54. The switching condition is a condition for determining whether to switch the process to be executed from the first process to the second process. In the present embodiment, the switching condition includes that the regenerative braking force BPR applied to the wheels FL, FR, RL, and RR becoming less than or equal to the switching determination value BPRTh. In the present embodiment, "0" is set as the switching determination value BPRTh.

When determination is not made that the switching condition is satisfied (S54: NO), the process proceeds to the next step S55. Then, in step S55, the first process is executed. In the first process, the braking force BP applied to each of the wheels FL, FR, RL, and RR is adjusted so that the decreasing speed of the braking force applied to the target wheel becomes larger than the decreasing speed of the braking force applied to the wheel that is not the target wheel. Then, the present processing routine is once terminated.

On the other hand, when determination is made that the switching condition is satisfied (step S54: YES), the process proceeds to the next step S56. In step S56, the second process is executed. Assuming the wheel to which the braking force is still applied at the time of transition from the first process to the second process is the decreasing wheel, the braking force applied to the decreasing wheel is decreased in the second process. In the present embodiment, a wheel that is not the target wheel corresponds to the decreasing wheel. Then, the present processing routine is once terminated.

Note that, in a case where any of the determination result of step S51, the determination result of step S52, and the determination result of step S53 is a negative determination (NO), the present processing routine is once terminated. Thus, in a case where a negative determination is made in step S52 or step S53 during the execution of the roll promotion control, the roll promotion control is terminated.

Next, the first process and the second process of the roll promotion control will be described in detail with reference to FIGS. 13A-13G. In FIGS. 13D, 13E, 13F and 13G, a broken line indicates the transition of the regenerative braking force BPR when the roll promotion control is not performed, and a thin solid line indicates the transition of the regenerative braking force BPR when the roll promotion control is performed. A thick solid line indicates the transition of the friction braking force BPF when the roll promotion control is performed.

In the example illustrated in FIGS. 13A-13G, from timing T42 during vehicle braking, the vehicle 10A starts to turn and the vehicle required braking force BPRC starts to decrease. Therefore, the roll promotion control is performed from timing T42. That is, a period from timing T42 to timing T43 is an execution period of the first process. In the present embodiment, both the rear wheel on the inside during turning and the front wheel on the outside during turning are target wheels. Therefore, in the first process, the regenerative braking force BPR applied to each of the wheels FL, FR, RL, and RR is decreased so that the decreasing speed of the regenerative braking force BPR applied to each of the wheels FL, FR, RL, and RR becomes larger than that when the roll promotion control is not performed. As a result, in the first process, the decreasing speed of the regenerative braking force BPR applied to the rear wheel on the inside during turning can be made larger than that when the roll promotion control is not performed, and the decreasing speed of the regenerative braking force BPR applied to the front wheel on the outside during turning can be made larger than that when the roll promotion control is not performed.

The force for suppressing the rolling motion of the vehicle 10A can be reduced at an early stage by reducing the braking force applied to the target wheel at an early stage in the above manner. That is, the anti-lift force generated in the vicinity of the rear wheel on the inside during turning in the rear portion of the vehicle can be reduced at an early stage as compared with when the roll promotion control is not performed by reducing the braking force applied to the rear wheel on the inside during turning at an early stage. Further, the anti-dive force generated in the vicinity of the front wheel on the outside during turning in the front portion of the vehicle can be reduced at an early stage as compared with when the roll promotion control is not performed by reducing the braking force applied to the front wheel on the outside during turning at an early stage. As a result, the rolling motion at the time of turning of the vehicle is promoted.

In the first process, the friction braking force BPF applied to the wheel, which is not the target wheel, is adjusted based on the difference between the vehicle required braking force BPRC and the total regenerative braking forces BPR applied to the wheels FL, FR, RL, and RR. That is, the friction braking force BPF applied to the rear wheel on the outside during turning and the friction braking force BPF applied to the front wheel on the inside during turning are respectively adjusted such that the sum of the total regenerative braking forces BPR applied to each of the wheels FL, FR, RL, and RR, the friction braking force BPF applied to the rear wheel on the outside during turning, and the friction braking force BPF applied to the front wheel on the inside during turning becomes equal to the vehicle required braking force BPRC. That is, the friction braking force BPF applied to the rear wheel on the outside during turning and the friction braking force BPF applied to the front wheel on the inside during turning are increased. Thus, the decreasing speed of the braking force applied to the rear wheel on the inside during turning, which is the target wheel, becomes larger than the decreasing speed of the braking force applied to the rear wheel on the outside during turning, which is not the target wheel. Furthermore, the decreasing speed of the braking force applied to the front wheel on the outside during turning, which is the target wheel, is larger than the decreasing speed of the braking force applied to the front wheel on the inside during turning, which is not the target wheel.

In the example illustrated in FIGS. 13A-13G, the regenerative braking force BPR applied to the target wheel becomes less than or equal to the switching determination value BPRTh at timing T43, and the switching condition is satisfied. Therefore, the first process is terminated, and the second process is started. In the present embodiment, at the start of the second process, the braking force is not applied to the target wheel, while the braking force is applied to the wheel that is not the target wheel. Therefore, in the second process, the braking force applied to the wheel that is not the target wheel, that is, the rear wheel on the outside during turning and the braking force applied to the front wheel on the inside during turning are respectively reduced. In the example illustrated in FIGS. 13A-13G, the friction braking force BPF is applied but the regenerative braking force BPR is not applied to the rear wheel on the outside during turning and the front wheel on the inside during turning. Therefore, the friction braking force BPF applied to the rear wheel on the outside during turning and the friction braking force BPF applied to the front wheel on the inside during turning are respectively decreased according to the decrease in the vehicle required braking force BPRC. Therefore, even during the execution of the second process, a state in which the total braking forces BP applied to the wheels FL, FR, RL, and RR matches the vehicle required braking force BPRC is maintained.

Then, at a timing T44 when the vehicle required braking force BPRC becomes "0", the friction braking force BPF applied to the rear wheel on the outside during turning and the friction braking force BPF applied to the front wheel on the inside during turning respectively become "0" by the execution of the second process. Therefore, the roll promotion control is terminated at timing T44.

Next, the operation and effect of the present embodiment will be described with reference to FIGS. 13A-13G. The example illustrated in FIGS. 13A-13G is a case where the vehicle 10A starts turning while being applied with the braking force, and the application of the braking force to the vehicle 10A is started in the middle of turning.

As shown in FIGS. 13A-13G, the braking force starts to be applied to the vehicle 10A at timing T41. In the example illustrated in FIGS. 13A-13G, the regenerative braking force BPR is applied to each of the wheels FL, FR, RL, and RR. The vehicle 10A starts to turn from timing T42 while the vehicle 10A is decelerating by the application of the braking force to each of the wheels FL, FR, RL, and RR. Further, the vehicle required braking force BPRC starts to decrease. At this time, when determined that the vehicle 10A is gradually turning, execution of the roll promotion control is started.

Here, a comparative example in which the roll promotion control is not performed in a case where the application of the braking force to the vehicle 10A is resolved while the vehicle 10A is turning and the vehicle 10A accelerates will be considered. In such a comparative example, as illustrated in FIG. 13C, the roll angle Φ of the vehicle 10A may fluctuate during the turning of the vehicle due to change in the anti-dive force and the anti-lift force caused by an increase in the absolute value of the lateral acceleration GY and a decrease in the braking force BP applied to the wheels FL, FR, RL, and RR during turning of the vehicle. That is, the roll angle Φ continues to change during the period in which the braking force decreases, and the occupant of the vehicle 10A may feel uncomfortable at this point.

On the other hand, in the present embodiment, the roll promotion control is performed when the vehicle required braking force BPRC is decreased during the turning of the vehicle. In the first process of the roll promotion control, the braking force applied to the rear wheel on the inside during turning and the front wheel on the outside during turning, which are the target wheels, is reduced at an early stage, while the braking force applied to the rear wheel on the outside during turning and the front wheel on the outside during turning, which are not the target wheels, is less likely to be reduced. Therefore, the anti-lift force generated in the vicinity of the rear wheel on the outside during turning in the rear portion of the vehicle can be increased as compared with when the roll promotion control is not performed by suppressing a decrease in the braking force applied to the rear wheel on the outside during turning or increasing the braking force. Furthermore, the anti-dive force generated in the vicinity of the front wheel on the inside during turning in the front portion of the vehicle can be increased as compared with when the roll promotion control is not performed by suppressing a decrease in the braking force applied to the front wheel on the inside during turning or increasing the braking force. As a result, the roll angle Φ of the vehicle 10A can be maintained in a large state at an initial stage in the decrease of the vehicle required braking force BPRC. Thus, the variation of the roll angle Φ of the vehicle 10A during the decrease of the vehicle required braking force BPRC is suppressed, and the comfort of the occupant of the vehicle 10A can be improved. In particular, for example, by performing the roll promotion control at the time of turning of the vehicle 10A such that the decrease in the braking force and the increase in the roll angle Φ overlap, the vertical movement of the front portion on the outside during turning and the rear portion on the inside during turning of the vehicle body is suppressed, and as a result, the comfort of the occupant can be improved. Examples of the case where the vehicle 10A turns so that the decrease in the braking force and the increase in the roll angle Φ overlap with each other include, for example, a case of shifting from a state of causing the vehicle 10A to travel straight while applying the braking force to the vehicle 10A to a state of causing the vehicle 10A to turn, and a case where the degree of turning is increased while decreasing the braking force in a state of causing the vehicle A to turn while applying the braking force. Increasing the degree of turning means that the absolute values of the yaw rate YR and the lateral acceleration GY of the vehicle 10A increase due to an increase in the steering angle of the steering wheel or the like.

However, in the present embodiment, when the braking force BP applied to the target wheel becomes "0", the first process shifts to the second process, so that the braking force applied to the front wheel on the outside during turning and the braking force applied to the rear wheel on the inside during turning are respectively reduced.

Modified Example

Each of the above embodiments can be modified and implemented as follows. Each of the above embodiments and the following modified examples can be implemented in combination with each other within a technically consistent scope.

In the second embodiment, the stability priority control may not be performed at the time of manual steering.

In the roll suppression control performed in the first embodiment, the reduction correction of the wheel required braking force BPRTW may not be performed at the time of manual steering.

As the μ value of the road surface on which the vehicle 10 travels becomes lower, the wheels FL, FR, RL, and RR are more likely to deceleration slip when the braking force is applied to the wheels FL, FR, RL, and RR. Therefore, in a case where the p value of the road surface can be estimated or the p value can be acquired, when the p value of road surface is less than or equal to the determination p value, determination is made that there is a possibility that a deceleration slip occurs in the wheel when a large braking force is applied to the rear wheel on the inside during turning by the roll suppression control, and the roll suppression control may not be performed. Even if the roll suppression control is performed, the wheel required braking force BPRTW with respect to the target wheel may be reduction corrected according to the low p value of the road surface.

When the braking force is applied to the target wheel or the braking force applied to the target wheel is increased by the execution of the roll suppression control, deceleration of the vehicle 10 by the execution of the roll suppression control may be permitted to some extent. That is, when the braking force applied to the target wheel is increased or the braking force is applied to the target wheel, the driving force output from the power source 11 of the vehicle 10 may not be adjusted. In particular, when the braking force is applied to the target wheel by the execution of the non-braking roll suppression control, the driving force output from the power source 11 of the vehicle 10 may not be adjusted.

In each of the above embodiments, the wheel required braking force BPRTW with respect to the rear wheel on the inside during turning is calculated based on the roll angle deviation $\Delta\Phi$ and the roll rate $\Phi R$ at the start of the roll suppression control. However, if the wheel required braking force BPRTW is calculated in consideration of the roll angle deviation $\Delta\Phi$, the roll rate $\Phi R$ may not be used for the calculation of the wheel required braking force BPRTW. Conversely, if the wheel required braking force BPRTW is calculated in consideration of the roll rate $\Phi R$, the roll angle deviation $\Delta\Phi$ may not be used for the calculation of the wheel required braking force BPRTW.

In each of the above embodiments, the wheel required braking force BPRTW may be calculated based on the roll angular acceleration which is the change speed of the roll rate $\Phi R$ of the vehicle. For example, the wheel required braking force BPRTW may be calculated such that the wheel required braking force BPRTW increases as the roll angular acceleration increases.

In the first embodiment and the second embodiment, the wheel required braking force BPRTW is calculated by feedforward control having the roll angle deviation $\Delta\Phi$ at the start of the roll suppression control as an input. However, in the roll suppression control, the roll angle deviation $\Delta\Phi$ may be sequentially monitored, and the wheel required braking force BPRTW may be varied according to the roll angle deviation $\Delta\Phi$. For example, the wheel required braking force BPRTW may be varied so that the roll angle deviation $\Delta\Phi$ approaches "0". In this case, when the roll angle deviation $\Delta\Phi$ becomes "0", the wheel required braking force BPRTW is held.

In the first embodiment and the second embodiment, the wheel required braking force BPRTW is calculated by feedforward control having the roll rate $\Phi R$ at the start of the roll suppression control as an input. However, in the roll suppression control, the deviation between the roll rate $\Phi R$ and the target value of the roll rate may be sequentially monitored, and the wheel required braking force BPRTW may be varied according to the deviation. For example, the wheel required braking force BPRTW may be varied so that the deviation approaches "0". In this case, when the deviation becomes "0", the wheel required braking force BPRTW is held.

In the first embodiment and the second embodiment, the wheel required braking force BPRTW with respect to the rear wheel on the inside during turning may be a sum of the braking force before the start of the roll suppression control and a preset specified value.

In the third embodiment and the fourth embodiment, the increasing speed of the friction braking force BPF applied to the target wheel during the increasing process and the decreasing speed of the regenerative braking force BPR applied to each of the wheels FL, FR, RL, and RR may be determined based on the roll angle deviation $\Delta\Phi$ and the roll rate $\Phi R$ at the start of the increasing process of the roll suppression control. In this case, the increasing speed of the friction braking force BPF applied to the target wheel during the increasing process is held at a constant value. On the other hand, during the increasing process, the roll angle deviation $\Delta\Phi$ and the roll rate $\Phi R$ may be sequentially monitored, and the increasing speed of the friction braking force BPF applied to the target wheel and the decreasing speed of the regenerative braking force BPR applied to each of the wheels FL, FR, RL, and RR may be varied based on the changes in the roll angle deviation $\Delta\Phi$ and the roll rate $\Phi R$. For example, the increasing speed of the friction braking force BPF applied to the target wheel and the decreasing speed of the regenerative braking force BPR applied to each of the wheels FL, FR, RL, and RR may be varied so that the roll angle deviation $\Delta\Phi$ approaches "0". In this case, during the increasing process, the increasing speed of the friction braking force BPF applied to the target wheel may change.

In the fifth embodiment, the increasing speed of the friction braking force BPF applied to the target wheel and the decreasing speed of the regenerative braking force BPR applied to each of the wheels FL, FR, RL, and RR during the first process may be determined based on the roll angle deviation $\Delta\Phi$ and the roll rate $\Phi R$ at the start of the first process of the roll promotion control. In this case, the increasing speed of the friction braking force BPF applied to the target wheel during the first process is held at a constant value. On the other hand, during the first process, the roll angle deviation $\Delta\Phi$ and the roll rate $\Phi R$ may be sequentially monitored, and the increasing speed of the friction braking force BPF applied to the target wheel and the decreasing speed of the regenerative braking force BPR applied to each of the wheels FL, FR, RL, and RR may be varied based on the changes in the roll angle deviation $\Delta\Phi$ and the roll rate $\Phi R$. For example, the increasing speed of the friction braking force BPF applied to the target wheel and the decreasing speed of the regenerative braking force BPR applied to each of the wheels FL, FR, RL, and RR may be varied so that the roll angle deviation $\Delta\Phi$ approaches "0". In this case, the increasing speed of the friction braking force BPF applied to the target wheel may change during the first process.

In the third embodiment and the fourth embodiment, a value larger than "0" may be set as the switching determination value BPFTh. Thus, for example, in a case where the state in which the longitudinal acceleration GX is not reduced continues, when the friction braking force BFP applied to the target wheel is reduced to less than or equal to the switching determination value BPFTh by the decreasing process, the process to be executed is shifted from the decreasing process to the holding process, and the friction braking force BFP applied to the target wheel is held. As a result, the roll suppression effect according to the friction braking force BFP applied to the target wheel is maintained even during the holding process.

In the fifth embodiment, a value larger than "0" may be set as the switching determination value BPRTh.

In the fifth embodiment, as the execution condition of the roll promotion control, increase in the degree of turning of the vehicle 10A and thus increase in the roll angle $\Phi$ may be added. For example, determination may be made that the degree of turning is increased when any one of the increase amount of the absolute value of the yaw rate YR during the predetermined period is greater than or equal to the determination value, the increase amount of the absolute value of the lateral acceleration GY during the predetermined period is greater than or equal to the determination value, and the increase amount of the steering angle STR during the predetermined period is greater than or equal to the determination value is satisfied. In addition, determination may be made that the degree of turning is increased when all of these conditions are satisfied.

In the first embodiment, the second embodiment, the third embodiment, and the fourth embodiment, when determination is not made that the vehicle 10, 10A gradually turns, the stability priority control is performed. However, when the determination is not made, the stability priority control may not be performed if the roll suppression control is not performed.

In the turning region close to the boundary where it is determined that the vehicle 10, 10A gradually turns, an increase in the wheel required braking force BPRTW with respect to the target wheel may be suppressed as compared with the more gradual turning region. For example, when the absolute value of the yaw rate YR is greater than or equal to the determination yaw rate YRTh2 (second predetermined value) smaller than the determination yaw rate YRTh (first predetermined value), the wheel required braking force BPRTW with respect to the roll angle deviation $\Delta\Phi$ may be calculated to be smaller than that when the absolute value of the yaw rate YR is less than the determination yaw rate YRTh2.

When the geometries of the suspensions 15FL and 15FR for the front wheels and the suspensions 15RL and 15RR for the rear wheels have the same values of the braking force applied to the front wheels FL and FR and the braking force applied to the rear wheels RL and RR, the anti-dive force FAD may be set to be larger than the anti-lift force FAL. In the roll suppression control performed in this case, it is preferable to select the front wheel on the outside during turning as the target wheel and suppress the rolling motion of the vehicle through adjustment of the braking force applied to the front wheel on the outside during turning.

Figure 14:
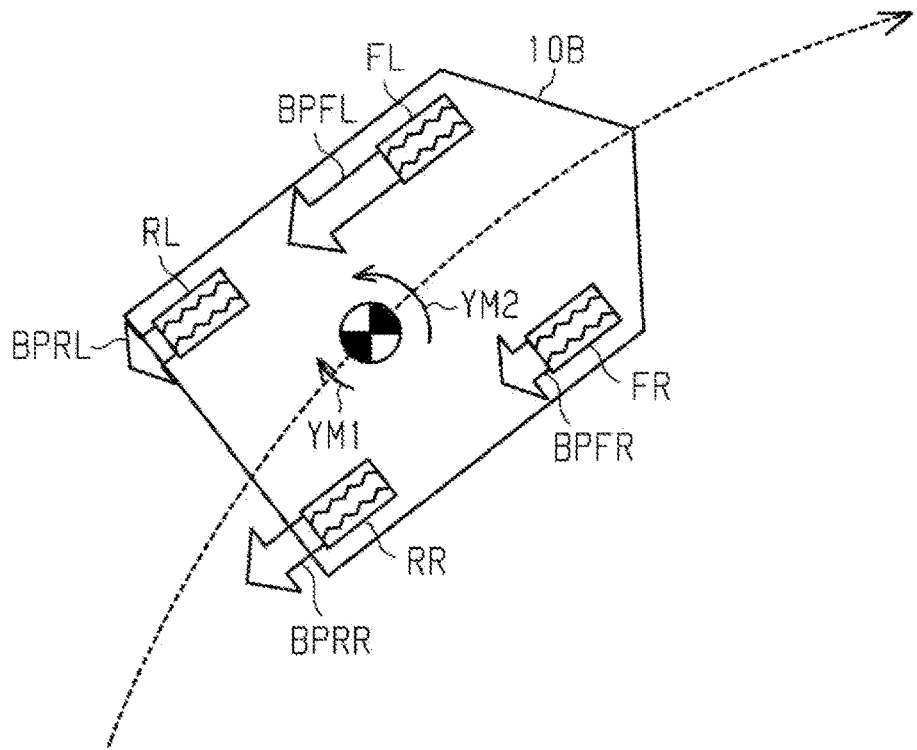
FIG. 14 is a schematic view illustrating a state in which the roll suppression control is performed while the vehicle is turning in a modified example.

For example, when the vehicle 10B turns right as illustrated in FIG. 14, in the roll suppression control, the braking force BPFL applied to the left front wheel FL corresponding to the front wheel on the outside during turning is made larger than any of the braking force BPFR applied to the right front wheel FR, the braking force BPRL applied to the left rear wheel RL, and the braking force BPRR applied to the right rear wheel RR. When such roll suppression control is performed, a large anti-dive force FAD is generated at the front portion on the outside during turning of the vehicle 10B. As a result, the rolling motion of the vehicle 10B can be suppressed, and furthermore, the change in the roll angle $\Phi$ of the vehicle 10B can be suppressed. Furthermore, due to the generation of the large anti-dive force FAD, the pitching motion of the vehicle 10B at the time of deceleration of the vehicle 10B can be suppressed, and furthermore, the change in the pitch angle of the vehicle 10B can be suppressed.

Figure 15:
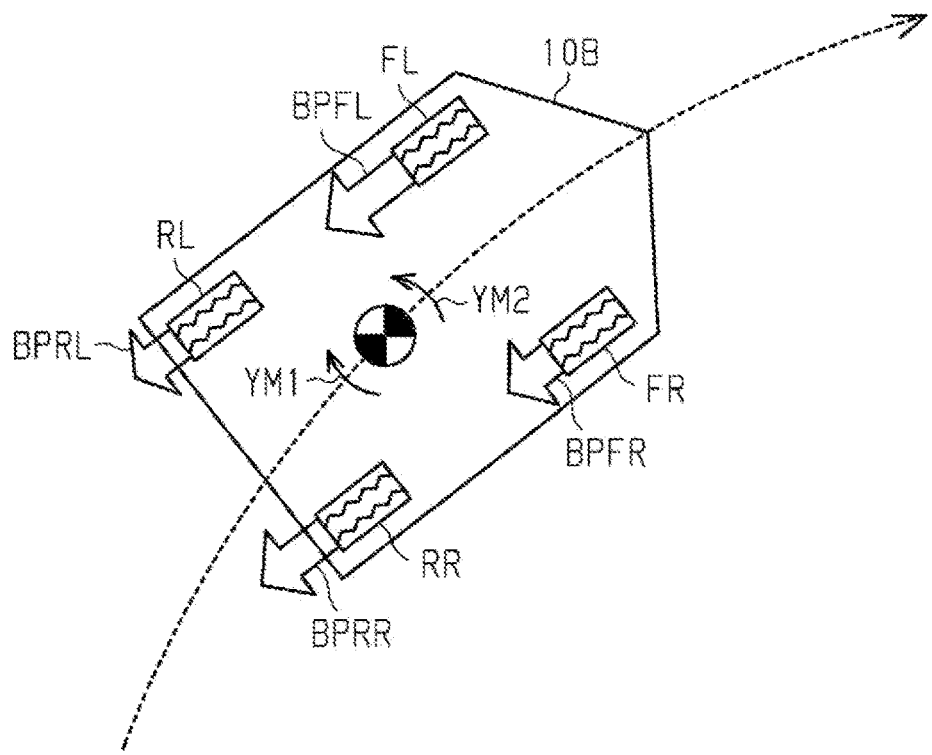
FIG. 15 is a schematic view illustrating a state in which the stability priority control is performed while the vehicle is turning in a modified example.

When a large braking force is applied to the front wheel on the outside during turning by the roll suppression control, the vehicle tends to exhibit an understeer tendency. Therefore, the stability priority control performed in the modified example is a control for suppressing understeer of the vehicle. For example, in the stability priority control for suppressing the understeer of the vehicle, the braking force applied to the front wheel on the outside during turning is made larger than the braking force applied to the front wheel on the inside during turning, and the braking force applied to the rear wheel on the inside during turning is made larger than the braking force applied to the rear wheel on the outside during turning. For example, when the vehicle 10B turns right as illustrated in FIG. 15, in the stability priority control, the braking force BPFL applied to the left front wheel FL, which is the front wheel on the outside during turning, is larger than the braking force BPFR applied to the right front wheel FR, which is the front wheel on the inside during turning, and the braking force BPRR applied to the right rear wheel RR, which is the rear wheel on the inside during turning, is larger than the braking force BPRL applied to the left rear wheel RL, which is the rear wheel on the outside during turning. The braking force difference $\Delta$BPF generated between the left and right front wheels FL and FR when the stability priority control is performed is smaller than the braking force difference $\Delta$BPF generated when the roll suppression control is performed. The yaw moment YM2 corresponding to the braking force difference $\Delta$BPF generated between the left and right front wheels FL and FR acts in a direction of increasing the understeer tendency of the vehicle 10B. On the other hand, the yaw moment YM1 corresponding to the braking force difference $\Delta$BPR generated between the left and right rear wheels RL and RR acts in a direction of increasing the oversteer tendency of the vehicle 10B. That is, since the direction of the yaw moment YM2 and the direction of the yaw moment YM1 are opposite to each other, the yaw moment YM2 is canceled out by the yaw moment YM1. As a result, the vehicle 10B is less likely to become understeer at the time of turning.

In each of the above embodiments, as the braking force applied to the vehicle at the time of turning becomes larger, that is, as the deceleration of the vehicle becomes larger, the stability of the action of the vehicle easily lowers when the roll suppression control is performed. Therefore, when the braking force of the vehicle is greater than or equal to the determination braking force which is an example of the first predetermined value, it may be determined that the vehicle turns slowly, and when the braking force of the vehicle is less than the determination braking force, it may be determined that the vehicle turns slowly.

In the roll suppression control, the distribution ratio of the braking force with respect to the rear wheel on the inside during turning may be made higher than that when the roll suppression control is not executed, and the distribution ratio of the braking force with respect to the front wheel on the outside during turning may be made higher than that when the roll suppression control is not executed.

In each of the above embodiments, the roll suppression control is performed even when the braking force is not applied to the vehicle at the time of turning of the vehicle. However, when the braking force is not applied to the vehicle even at the time of turning of the vehicle, the roll suppression control may not be performed.

In each of the above embodiments in which the roll suppression control is executed, when the slip amount SLP of at least one wheel becomes greater than or equal to the determination slip amount SLPTh during the execution of the roll suppression control, the roll suppression control is terminated and the stability priority control is started. In such a case, the shift control may be performed while the roll suppression control is terminated and the stability priority control is started. For example, the shift control is a control that gradually changes the control amount of each actuator from the control amount of the roll suppression control toward the control amount of the stability priority control.

In the third embodiment and the fourth embodiment, in the execution of the roll suppression control, only one of the rear wheel on the inside during turning and the front wheel on the outside during turning may be set as the target wheel.

In the third embodiment, the roll suppression control may not include the decreasing process as long as the roll suppression control includes the increasing process and the holding process. In this case, when increase of the friction braking force BPF applied to the target wheel by the increasing process is completed and the execution condition of the increasing process is not satisfied, the braking force applied to each of the wheels FL, FR, RL, and RR may be held by the execution of the holding process.

In the third embodiment and the fourth embodiment, the roll suppression control may not be performed at the time of manual steering. At the time of manual steering, the increase amount of the friction braking force BPF applied to the target wheel accompanying the execution of the increasing process may be reduced as compared with that at the time of automatic driving.

In the third embodiment and the fourth embodiment, the control device 100 may be applied to a vehicle including the motor generator MG1 that applies the regenerative braking force BPR to both front wheels FL and FR but not including the motor generator MG2 that applies the regenerative braking force BPR to both rear wheels RL and RR. Further, the control device 100 may be applied to a vehicle not including the motor generator MG1 but including the motor generator MG2.

In the fifth embodiment, the control device 100 may be applied to a vehicle including the motor generator MG1 but not including the motor generator MG2. Further, the control device 100 may be applied to a vehicle not including the motor generator MG1 but including the motor generator MG2.

In the fifth embodiment, in the execution of the roll promotion control, only one of the rear wheel on the inside during turning and the front wheel on the outside during turning may be set as the target wheel.

In each of the above embodiments, when at least one of the conditions of (condition 1) to (condition 4) is not satisfied, determination that the vehicle gradually turns may not be made.

When at least some of the conditions of (condition 1) to (condition 4) are satisfied, determination that the vehicle gradually turns may be made.

Conditions other than (condition 1) to (condition 4) described above may be included as conditions for determining whether the vehicle 10 gradually turns. Examples of other conditions include that the absolute value Examples of other conditions include that the absolute value of the change speed ΔGY of the lateral acceleration GY is less than the determination lateral acceleration change speed ΔGYTh, and that the absolute value of the change speed ΔYR of the yaw rate YR is less than the determination yaw rate change speed ΔYRTh. When such a condition is used, at least one of (condition 1) to (condition 4) may be deleted from the condition for determining whether the vehicle 10 gradually turns.

The braking device may have any configuration as long as the braking force applied to each of the wheels FL, FR, RL, and RR can be individually controlled. For example, the braking device may be an electric braking device capable of applying friction braking force to the wheels FL, FR, RL, and RR without using brake fluid. Furthermore, in a vehicle in which a motor, that is, an in-wheel motor is provided for each of the wheels FL, FR, RL, and RR, regenerative braking force can be generated by each motor at the time of vehicle braking. That is, in the vehicle, the regenerative braking force applied to each of the wheels FL, FR, RL, and RR can be individually adjusted. Therefore, in the first embodiment and the second embodiment, when a vehicle in which a motor is individually provided for each of the wheels FL, FR, RL, and RR is applied as the vehicle, the regenerative braking force applied to each of the wheels FL, FR, RL, and RR may be individually adjusted in the roll suppression control.

The driving system of the vehicle to which the control device is applied may be a rear wheel driving system or a front wheel driving system.

The control device 100 may have any one of the following configurations (a) to (c).

(a) The control device 100 includes one or more processors that execute various processes according to a computer program. The processor includes a CPU and memories such as a RAM and a ROM. The memory stores a program code or a command configured to cause the CPU to execute processes. The memory, that is, the computer-readable medium, includes any available medium that can be accessed by a general-purpose or dedicated computer.

(b) The control device 100 includes one or more dedicated hardware circuits that execute various processes. Examples of the dedicated hardware circuit include, for example, an application-specific integrated circuit, that is, an ASIC or an FPGA. The ASIC is an abbreviation for "Application Specific Integrated Circuit", and the FPGA is an abbreviation for "Field Programmable Gate Array".

(c) The control device 100 includes a processor that executes part of various processes in accordance with a computer program, and a dedicated hardware circuit that executes the remaining processes among the various processes.

Next, a technical idea that can be grasped from the above embodiments and the modified examples will be described.

(A) The parameter is preferably at least one of a steering angle of the steering wheel 21, a turning angle of the turning wheel, a lateral acceleration of the vehicle, a yaw rate of the vehicle, and a vehicle body slip angle of the vehicle. In this case, when the absolute value of the parameter is less than the determination value, determination that the vehicle gradually turns can be made.

(B) The parameter is at least one of a vehicle body speed of the vehicle and a braking force of the vehicle. In this case, when the absolute value of the parameter is less than the determination value, determination that the vehicle gradually turns can be made.

The invention claimed is:

1. A vehicle action control device applied to a vehicle in which an anti-dive force that is a force for displacing a front portion of a vehicle upward is generated when a braking force is applied to a front wheel, and an anti-lift force that is a force for displacing a rear portion of the vehicle downward is generated when a braking force is applied to a rear wheel, the vehicle action control device comprising:

a vehicle required braking force acquisition unit that acquires a vehicle required braking force which is a required value of a braking force applied to the vehicle; and a roll control unit that performs a roll suppression control of suppressing a rolling motion of the vehicle by adjusting a distribution ratio of a braking force with respect to a target wheel including at least one of a rear wheel on an inside during turning of the vehicle and a front wheel on an outside during turning of the vehicle when the braking force is applied to the vehicle according to the vehicle required braking force under a situation where the vehicle is turning, wherein execution of the roll suppression control is started when a determination is made that the vehicle is gradually turning and there is no wheel in which the slip amount is greater than or equal to the determination slip amount which is set as a determination criterion for whether a deceleration slip has occurred in the wheels, wherein in the roll suppression control, the roll control unit sets the distribution ratio of a braking force with respect to at least one of a rear wheel on an inside during turning of the vehicle and a front wheel on an outside during turning of the vehicle higher than a distribution ratio when the roll suppression control is not performed, and wherein the roll control unit permits execution of the roll suppression control when the vehicle turns by automatic driving, and does not permit execution of the roll suppression control when the vehicle turns by manual steering.

2. The vehicle action control device according to claim 1, wherein the roll control unit performs the roll suppression control when a parameter indicating a yawing motion of the vehicle is less than a first predetermined value.

3. The vehicle action control device according to claim 2, wherein in the roll suppression control, the roll control unit increases a distribution ratio of a braking force with respect to at least one of a rear wheel on an inside during turning of the vehicle and a front wheel on an outside during turning of the vehicle as the parameter becomes larger.

4. The vehicle action control device according to claim 3, wherein in the roll suppression control, when the parameter is greater than or equal to a second predetermined value less than the first predetermined value, the roll control unit suppresses an increase in a distribution ratio of a braking force with respect to at least one of a rear wheel on an inside during turning of the vehicle and a front wheel on an outside during turning of the vehicle.

5. The vehicle action control device according to claim 1, wherein in the roll suppression control, the roll control unit makes a braking force applied to at least one of a rear wheel on an inside during turning of the vehicle and a front wheel on an outside during turning of the vehicle larger than when the roll suppression control is not executed.

6. The vehicle action control device according to claim 1, wherein in the roll suppression control, as a value obtained by subtracting a target roll angle from a roll angle of the vehicle at the start of the roll suppression control becomes larger, the roll control unit increases braking force applied to at least one of a rear wheel on an inside during turning of the vehicle and a front wheel on an outside during turning of the vehicle.

7. The vehicle action control device according to claim 1, wherein in the roll suppression control, as the roll rate of the vehicle at the start of the roll suppression control becomes larger, the roll control unit increases braking force applied to at least one of a rear wheel on an inside during turning of the vehicle and a front wheel on an outside during turning of the vehicle.

8. The vehicle action control device according to claim 1, wherein the roll control unit makes a control amount of the roll suppression control when the vehicle turns by manual steering smaller than a control amount of the roll suppression control when the vehicle turns by automatic driving.

9. The vehicle action control device according to claim 1, wherein the roll control unit terminates the roll suppression control when a deceleration slip occurs in at least one of the wheels of the vehicle during execution of the roll suppression control.

10. The vehicle action control device according to claim 1, wherein the vehicle includes a friction braking device that adjusts a friction braking force applied to each of the wheels and a regenerative device that adjusts a regenerative braking force applied to two front wheels of each of the wheels, and in the roll suppression control, the roll control unit controls the friction braking device and the regenerative device such that only the regenerative braking force of the friction braking force and the regenerative braking force is applied to the front wheel on the inside during turning of the vehicle, and both the friction braking force and the regenerative braking force are applied to the front wheel on the outside during turning of the vehicle.

11. The vehicle action control device according to claim 1, wherein the vehicle includes a friction braking device that adjusts a friction braking force applied to each of the wheels and a regenerative device that adjusts a regenerative braking force applied to two rear wheels of each of the wheels, and in the roll suppression control, the roll control unit controls the friction braking device and the regenerative device such that only the regenerative braking force of the friction braking force and the regenerative braking force is applied to the rear wheel on the outside during turning of the vehicle, and both the friction braking force and the regenerative braking force are applied to the rear wheel on the inside during turning of the vehicle.

12. The vehicle action control device according to claim 1, wherein the roll control unit performs a roll promotion control of promoting the rolling motion of the vehicle when a braking force of the vehicle is decreased at the time of turning of the vehicle, and in the roll promotion control, the roll control unit makes a distribution ratio of a braking force with respect to at least one of a rear wheel on an inside during turning of the vehicle and a front wheel on an outside during turning of the vehicle lower than a distribution ratio when the roll promotion control is not performed.

13. A vehicle action control device applied to a vehicle in which an anti-dive force that is a force for displacing a front portion of a vehicle upward is generated when a braking force is applied to a front wheel, and an anti-lift force that is a force for displacing a rear portion of the vehicle downward is generated when a braking force is applied to a rear wheel, the vehicle action control device comprising:

a vehicle required braking force acquisition unit that acquires a vehicle required braking force which is a required value of a braking force applied to the vehicle; and a roll control unit that performs a roll suppression control of suppressing a rolling motion of the vehicle by adjusting a distribution ratio of a braking force with respect to a target wheel including at least one of a rear wheel on an inside during turning of the vehicle and a front wheel on an outside during turning of the vehicle when the braking force is applied to the vehicle according to the vehicle required braking force under a situation where the vehicle is turning, wherein execution of the roll suppression control is started when a determination is made that the vehicle is gradually turning and there is no wheel in which the slip amount is greater than or equal to the determination slip amount which is set as a determination criterion for whether a deceleration slip has occurred in the wheels, wherein in the roll suppression control, the roll control unit sets the distribution ratio of a braking force with respect to at least one of a rear wheel on an inside during turning of the vehicle and a front wheel on an outside during turning of the vehicle higher than a distribution ratio when the roll suppression control is not performed, and wherein the roll control unit makes a control amount of the roll suppression control when the vehicle turns by manual steering smaller than a control amount of the roll suppression control when the vehicle turns by automatic driving.

14. The vehicle action control device according to claim 13, wherein the roll control unit performs the roll suppression control when a parameter indicating a yawing motion of the vehicle is less than a first predetermined value.

15. The vehicle action control device according to claim 14, wherein in the roll suppression control, the roll control unit increases a distribution ratio of a braking force with respect to at least one of a rear wheel on an inside during turning of the vehicle and a front wheel on an outside during turning of the vehicle as the parameter becomes larger.

16. The vehicle action control device according to claim 15, wherein in the roll suppression control, when the parameter is greater than or equal to a second predetermined value less than the first predetermined value, the roll control unit suppresses an increase in a distribution ratio of a braking force with respect to at least one of a rear wheel on an inside during turning of the vehicle and a front wheel on an outside during turning of the vehicle.

17. The vehicle action control device according to claim 13, wherein in the roll suppression control, the roll control unit makes a braking force applied to at least one of a rear wheel on an inside during turning of the vehicle and a front wheel on an outside during turning of the vehicle larger than when the roll suppression control is not executed.

18. The vehicle action control device according to claim 13, wherein in the roll suppression control, as a value obtained by subtracting a target roll angle from a roll angle of the vehicle at the start of the roll suppression control becomes larger, the roll control unit increases braking force applied to at least one of a rear wheel on an inside during turning of the vehicle and a front wheel on an outside during turning of the vehicle.

19. The vehicle action control device according to claim 13, wherein in the roll suppression control, as the roll rate of the vehicle at the start of the roll suppression control becomes larger, the roll control unit increases braking force applied to at least one of a rear wheel on an inside during turning of the vehicle and a front wheel on an outside during turning of the vehicle.

20. The vehicle action control device according to claim 13, wherein the roll control unit terminates the roll suppression control when a deceleration slip occurs in at least one of the wheels of the vehicle during execution of the roll suppression control.

21. The vehicle action control device according to claim 13, wherein the vehicle includes a friction braking device that adjusts a friction braking force applied to each of the wheels and a regenerative device that adjusts a regenerative braking force applied to two front wheels of each of the wheels, and in the roll suppression control, the roll control unit controls the friction braking device and the regenerative device such that only the regenerative braking force of the friction braking force and the regenerative braking force is applied to the front wheel on the inside during turning of the vehicle, and both the friction braking force and the regenerative braking force are applied to the front wheel on the outside during turning of the vehicle.

22. The vehicle action control device according to claim 13, wherein the vehicle includes a friction braking device that adjusts a friction braking force applied to each of the wheels and a regenerative device that adjusts a regenerative braking force applied to two rear wheels of each of the wheels, and in the roll suppression control, the roll control unit controls the friction braking device and the regenerative device such that only the regenerative braking force of the friction braking force and the regenerative braking force is applied to the rear wheel on the outside during turning of the vehicle, and both the friction braking force and the regenerative braking force are applied to the rear wheel on the inside during turning of the vehicle.

23. The vehicle action control device according to claim 13, wherein the roll control unit performs a roll promotion control of promoting the rolling motion of the vehicle when a braking force of the vehicle is decreased at the time of turning of the vehicle, and in the roll promotion control, the roll control unit makes a distribution ratio of a braking force with respect to at least one of a rear wheel on an inside during turning of the vehicle and a front wheel on an outside during turning of the vehicle lower than a distribution ratio when the roll promotion control is not performed.

* * * * *